United States Patent [19]

Mullins et al.

[11] Patent Number: 5,404,374
[45] Date of Patent: Apr. 4, 1995

[54] METHOD AND APPARATUS FOR TRANSMITTING AND RECEIVING ENCODED DATA USING MULTIPLE FREQUENCY CODING

[75] Inventors: Jeffery L. Mullins, San Jose; Edward W. Geiger, San Martin, both of Calif.

[73] Assignee: Apple Computer, Inc., Cupertino, Calif.

[21] Appl. No.: 90,886

[22] Filed: Jul. 12, 1993

[51] Int. Cl.$^6$ ............................................. H04K 1/00
[52] U.S. Cl. ................................. 375/200; 375/259; 371/70; 370/21
[58] Field of Search ...................... 375/1, 40; 371/70; 370/21

[56] References Cited

U.S. PATENT DOCUMENTS

| | | | |
|---|---|---|---|
| 4,267,592 | 5/1981 | Craiglow | 370/29 |
| 4,271,524 | 6/1981 | Goodman et al. | 375/1 |
| 4,638,493 | 1/1987 | Bishop et al. | 375/1 |
| 4,866,710 | 9/1989 | Schaeffer | 370/95 |
| 4,975,926 | 12/1990 | Knapp | 375/1 |
| 5,029,183 | 7/1991 | Tymes | 375/1 |
| 5,048,057 | 9/1991 | Saleh et al. | 375/40 |
| 5,079,768 | 1/1992 | Flammer | 370/94 |
| 5,081,641 | 1/1992 | Kotzin et al. | 375/1 |
| 5,103,461 | 4/1992 | Tymes | 375/1 |
| 5,119,104 | 6/1992 | Heller | 342/450 |
| 5,151,919 | 9/1992 | Dent | 375/1 |
| 5,168,510 | 12/1992 | Hill | 375/1 |
| 5,193,102 | 3/1993 | Meidan et al. | 375/1 |
| 5,212,808 | 5/1993 | Su et al. | |
| 5,224,121 | 6/1993 | Schorman | 375/1 |
| 5,239,555 | 8/1993 | Konig | |
| 5,247,702 | 9/1993 | Su et al. | |
| 5,311,542 | 5/1994 | Eder | |

OTHER PUBLICATIONS

Saleh, and Cimini, Jr., "Indoor Radio Communications Using Time-Division Multiple Access with Cyclical Slow Frequency Hopping and Coding", IEEE Journal on Selected Areas in Communication, vol. 7, No. 1, Jan. 1989, p. 59-7.

Saleh, et al., "A TDMA Indoor Radio Communications System Using Cyclical Slow Frequency Hopping and Coding—Experimental Results and Implementation Issues", IEEE Global Telecommunicatons Conference & Exhibition, Hollywood Fla., Nov. 28–Dec. 1, 1988, pp. 1337–1342.

Bertsekas, and Gallager, "Data Networks", Prentice-Hall, Inc., 1987, pp. 240–248.

*Primary Examiner*—David C. Cain
*Attorney, Agent, or Firm*—Blakely, Sokoloff, Taylor & Zafman

[57] ABSTRACT

In a communication system including a plurality of networked stations that communicate using a slow frequency hopping system, a method for encoding a packet of data in a transmitting station and decoding the data in a receiving station. In the transmitting station, the packet is divided into data segments. Error correction segments are added to correct the data segments. The segments are fragmented into a series of fragments, and a data error control field is calculated for each fragment and appended thereto. The data units including the segments are transmitted, and in a receiving station all or a portion of the bursts are received. The DEC field for each received fragment is calculated and compared with the received DEC field to determine whether each fragment is good or bad. If there are a sufficient number of fragments in each column, then the data can be reconstructed.

12 Claims, 15 Drawing Sheets

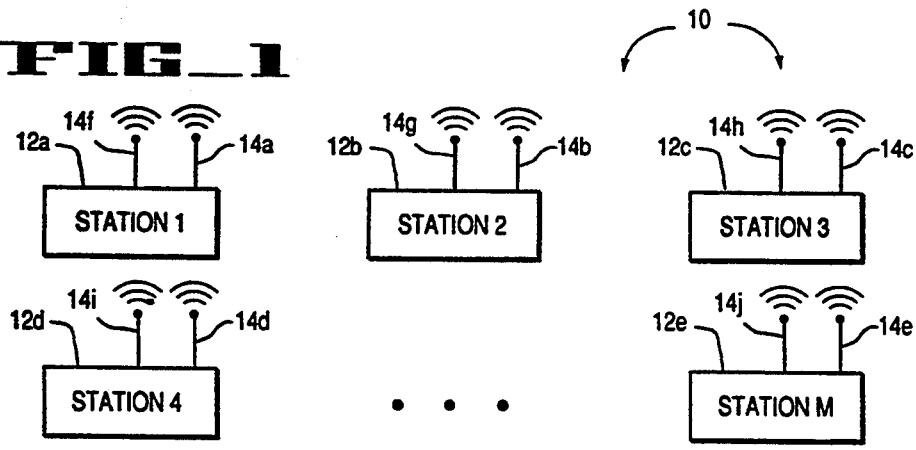
FIG_1
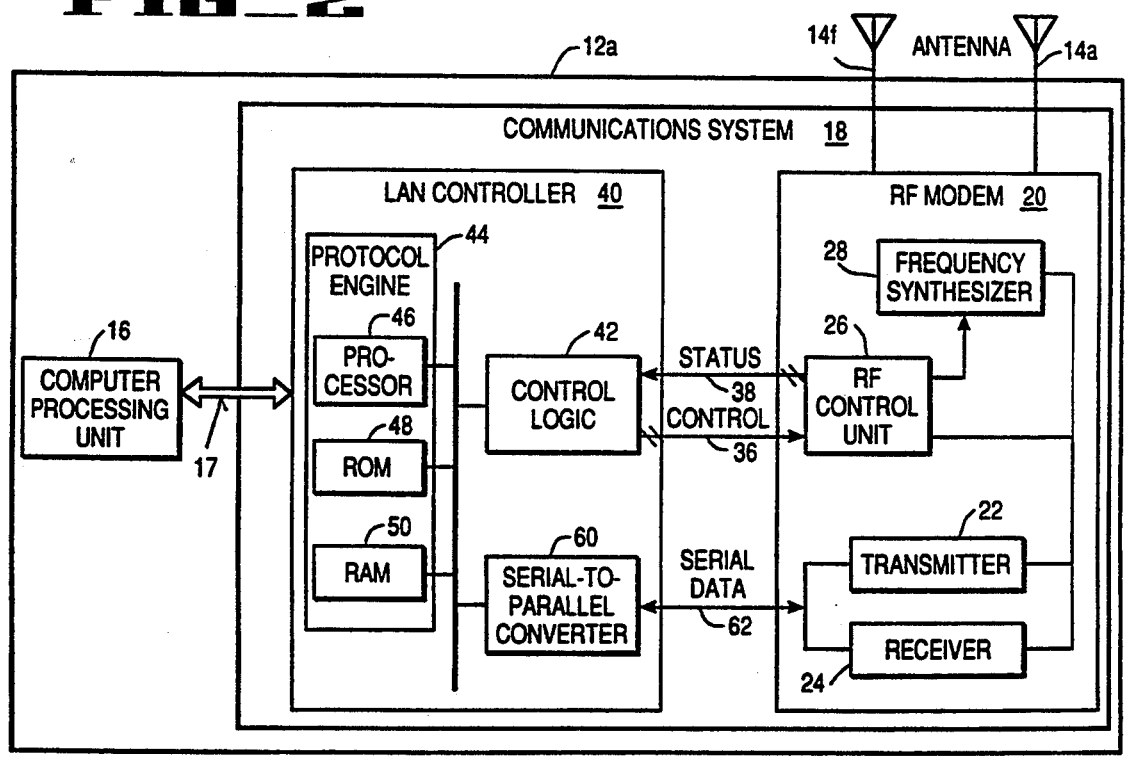
FIG_2
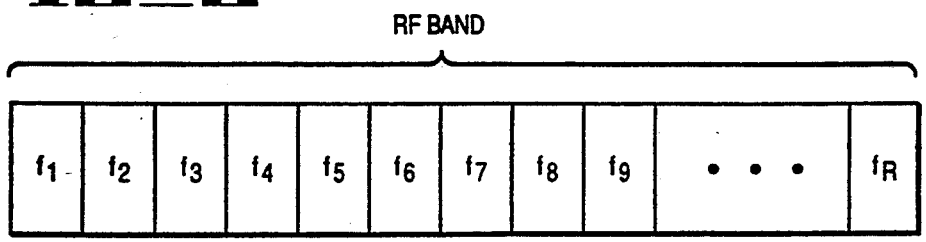
FIG_3

RF Hopping Protocol High Level State Diagram

FIG_5

FIG_6

FIG_7

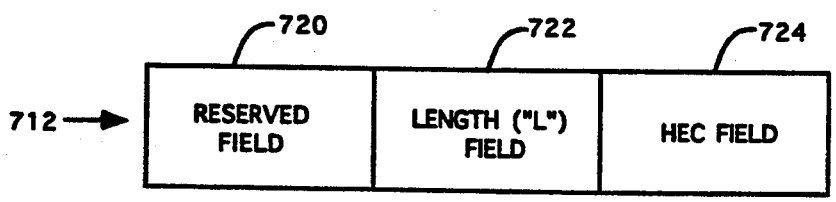
Fig. 8
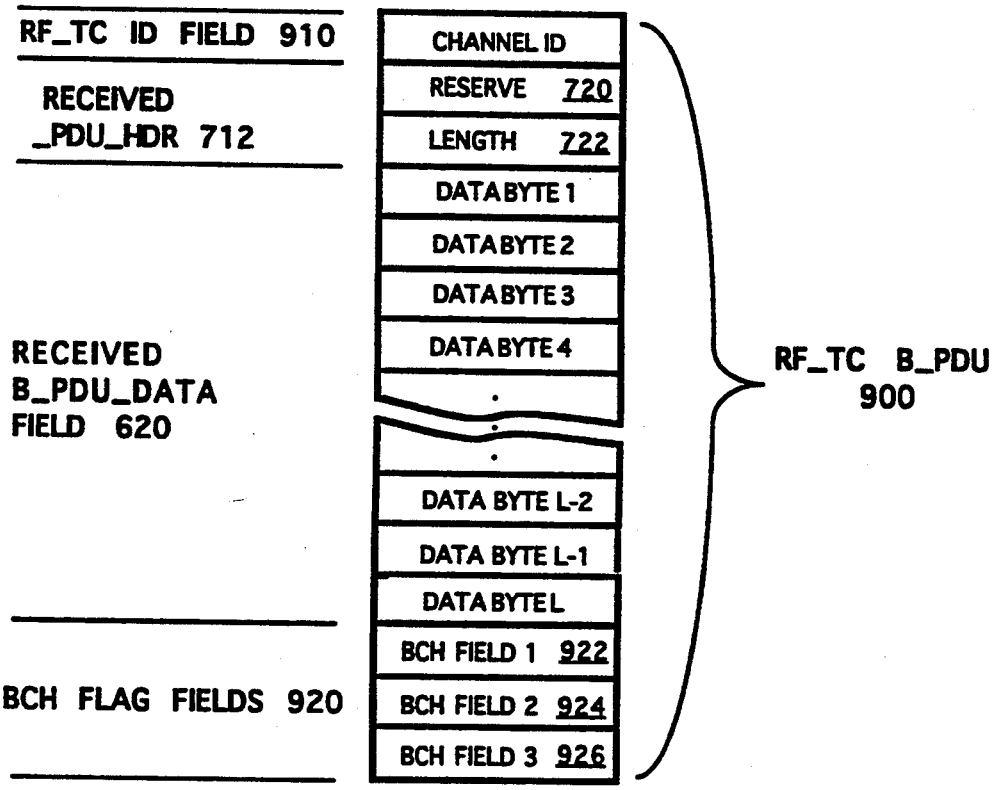
Fig. 9
FORWARD ERROR CORRECTION
RECONSTRUCTION MAP
FIG. 10

SCAN State Machine

Relationship Between T_SCAN and T_PREAML

RECEIVE State Machine

Timing Relationship Between TRANSMIT & RECEIVE state Machines

Timing Relationship Between TRANSMIT & RECEIVE state Machines for a Short Preamble CARRIER SENSE State Machine

TRANSMIT State Machine

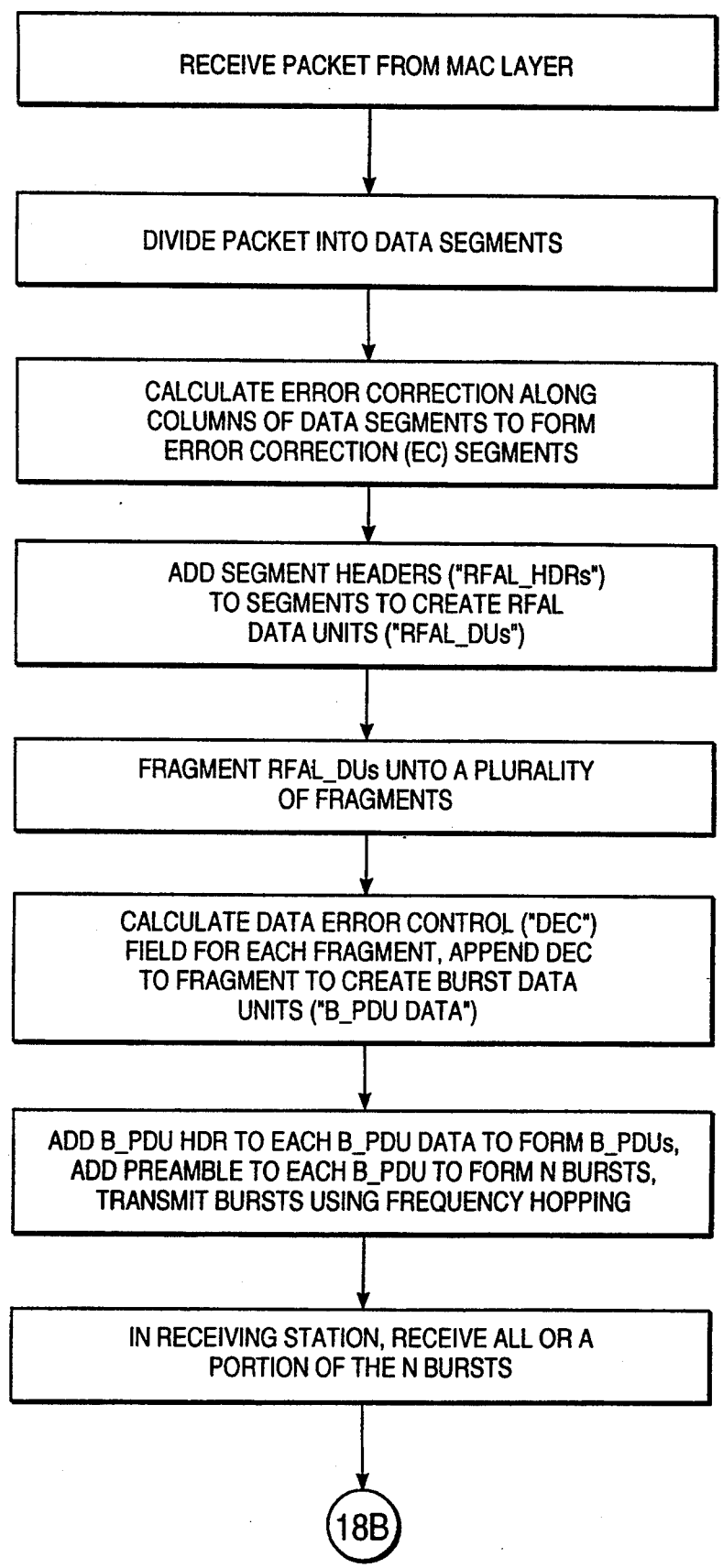
FIG_18A

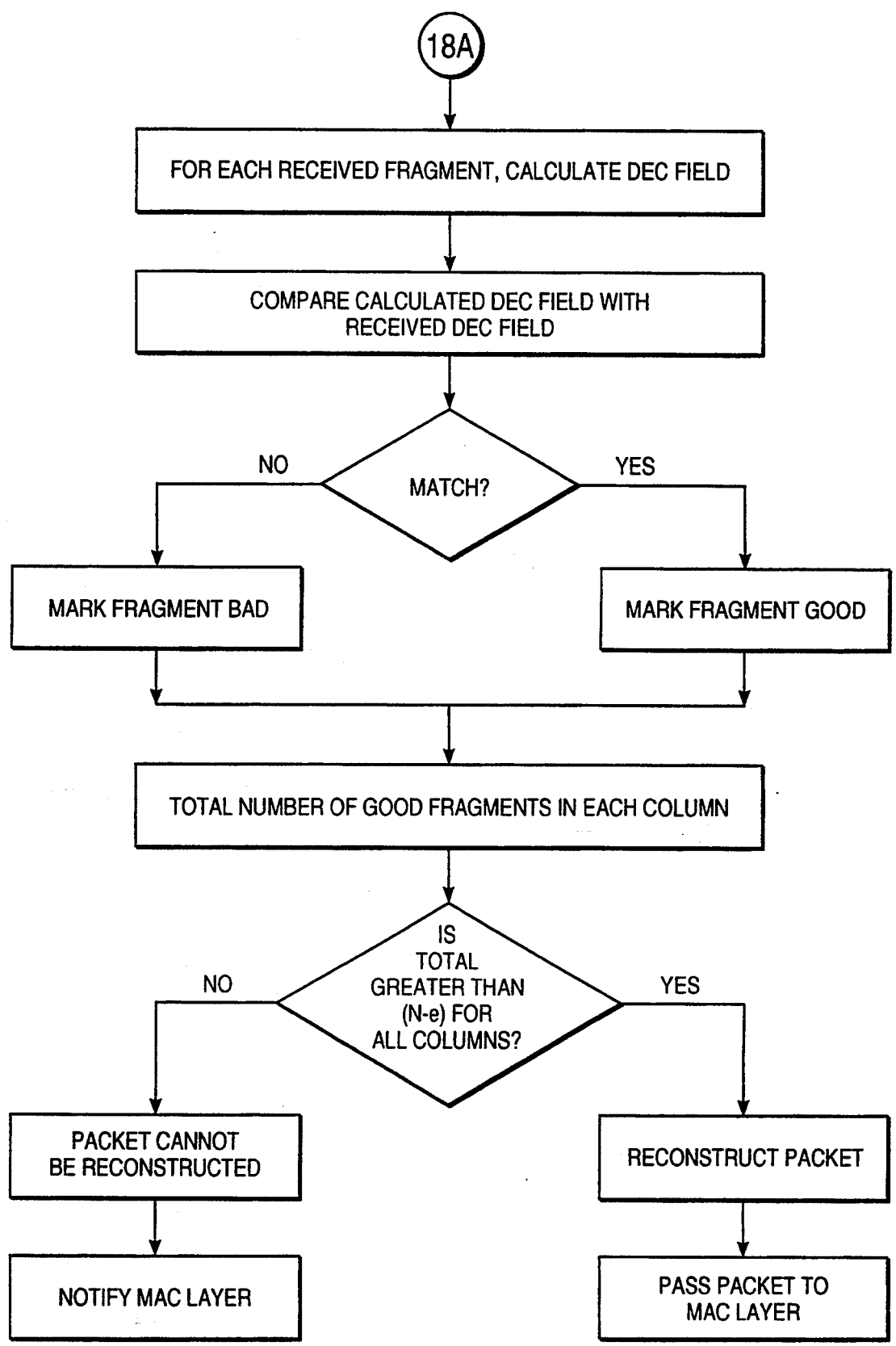
FIG_18B

METHOD AND APPARATUS FOR TRANSMITTING AND RECEIVING ENCODED DATA USING MULTIPLE FREQUENCY CODING

Cross-reference is hereby made to the following copending commonly assigned patent application: "Scanning Method for Receiving a Transmission in a Communication System with Slow Frequency Hopping and Coding", by Paulette R. Altmaier and Peter J. Potrebic, filed Dec. 29, 1992, Ser. No. 07/997,880, which is incorporated by reference herein.

BACKGROUND OF THE INVENTION

1. Field of the Invention

The present invention relates to communication systems with multiple stand-alone stations that transmit data using multiple frequency coding.

2. Description of Related Art

Communication networks provide a system by which a number of stations communicate. Many types of communication networks have been developed. Conventionally, multiple stations are interconnected by cables. However, a wireless communication network that operates efficiently using radio frequency signals would be advantageous for many uses. In one type of wireless network, a master controller receives and transmits signals between all stations on the network. The master controller operates as an intermediary, arbitrating and allocating communication between the stations. However, a master controller introduces additional costs, and it would be an advantage if the wireless network did not utilize a master controller and thus would be "decentralized".

A decentralized, wireless communication system includes a plurality of stand-alone stations that communicate with radio frequency signals. If a practical system could be developed to operate efficiently, it would be particularly useful for an in-door communication system between stand-alone computer stations, for example in an office environment.

To communicate, simple conventional radio systems use a single dedicated radio frequency. However, the number of available radio frequencies is limited, and as the number of stations increase, the probability of a collision between single frequency signals becomes more and more likely. Other significant problems with single frequency systems include interference from other sources of RF energy and fading due to environmental factors, either of which can render all or a part of a message unreadable. For example, the indoor radio environment is characterized by potentially severe multipath fading, together with large propagation losses. Multipath fading causes the signal-to-noise ratio (SNR) vs. bit-error ratio (BER) curves to differ significantly from their flee-space characteristics. It has been experimentally determined that the indoor radio environment at about 1.0 GHz can be modeled as a very slowly varying, frequency-selective, Rayleigh fading environment. The movement of people, objects, etc. within the building causes the signal amplitude at a point to be slowly varying. Even with a dedicated radio frequency band, there are potentially serious problems with interference from other devices that emit radio frequency energy on the same channel during operation. Increasing transmission power is not a practical option because transmission power is limited by cost constraints and governmental regulation.

To provide a practical in-door communication system, it has been suggested to use a number (N) of radio frequency signals that are transmitted in a particular sequence known to the receiving stations. The technique of sequencing through N channels, when combined with coding techniques to be discussed, is called "cyclical slow frequency hopping and coding", and can be a useful technique to combat fading and interference in a wireless network. In a system using cyclical slow frequency hopping and coding, data to be transmitted is divided into segments, and each segment is transmitted on a different carrier frequency (channel). Burst error correction can be used when the data is re-assembled, thereby permitting the data to be correctly reconstituted even in the presence of fading or interference on one or more channels, even if up to e segments out of the N are corrupted. This technique is described in detail in "Indoor Radio Communications Using Time-Division Multiple Access with Cyclical Slow Frequency Hopping and Coding", by Adel A. M. Saleh and Leonard J. Cimini, Jr., *IEEE Journal on Selected Areas in Communications*, Vol. 7, No. 1, January 1989, pp. 59–70.

A RF Data Transport Protocol is required to send and receive data in a decentralized Local Area Network (LAN), in which all nodes are peers, using a slow frequency hopping communication system requires an RF Data Transport Protocol that will accurately move packets from the transmitter to the receiver under the control of a higher layer Media Access Control (MAC) protocol. Token passing protocols, in which one or more nodes are dynamically designated as a master node on the LAN, are not suitable, given the possibility of hidden nodes and the (semi) mobile nature of the nodes on the LAN. It has been suggested to use time division multiplexing to implement a system with cyclical slow frequency hopping. In a system with time division multiplexing, each station has a designated time slot in which it can transmit. However, time division multiplexing requires precise synchronization between all the machines on the network, a requirement that is difficult to meet in a decentralized system because the receiving stations do not know when to begin receiving the transmission, nor do they know when to start transmitting.

An appropriate MAC protocol for a decentralized LAN is described in the patent application cross-referenced above, entitled "Scanning Method for Receiving a Transmission in a Communication System with Slow Frequency Hopping and Coding" by Paulette R. Altmaier and Peter J. Potrebic, which describes a system in which receiving stations scan the first (N-e) frequencies, and if a transmission is detected, they receive as much of the message as possible. The entire message is recoverable if (N-e) out of the N packets are recoverable. However, that system works only if (N-e) complete messages (packets) are received. If all of the bursts are degraded or corrupted to some extent, then the message will not be recoverable. It would be an advantage to provide a communication coding system that allows message recovery even if more than (N-e) of the packets are corrupted in some way. Such a system would be particularly useful in a wireless communication system.

SUMMARY OF THE INVENTION

The encoding and decoding technique described herein improves the probability of recovery of a coded, slow-frequency hopped transmission in a decentralized environment, where no master control station is present. The technique could also be useful in some centralized environments. Arbitrary or fixed size packets can be sent.

In a communication system for networking a plurality of stations, each of which includes a transmitter and a receiver, a method is described herein for encoding a packet of data in a transmitting station that transmits the packet in a series of N bursts, and decoding data in a receiving station that receives at least one of said bursts and decodes said received bursts to reconstruct said packet of data. The method includes dividing each packet into data segments and adding error correction (EC) segments. The segments (both data and EC) are then further divided into a series of fragments having a predetermined size in the transmitting station. A data error control (DEC) field is calculated for each fragment in a segment, and added to the segment to provide a data unit for transmission. The data units are then transmitted in a series of bursts, each on a different channel in a predetermined hop sequence. In a receiving station, due to interference or fading, less than all of the N bursts may be received. For each received burst, the received fragments are examined to determine whether each fragment is good or bad. The number of good fragments in each column is totaled, and if the total is greater than a number (N-e) that is the minimum number of fragments necessary to reconstruct the data, then the data is reconstructed. A column is defined by fragments in like position across the segments (both data and EC segments).

The RF Data Transport Protocol performs the operations described herein. In a transmitting station, it receives a packet of data, and performs operations necessary to prepare the packet for transmission, and to transmit it from the transmitting station. In a receiving station, the protocol specifies how to process whatever data is received, and to reconstruct the packet if possible. The RF data Transport Protocol is described in terms of two layers: a RF Adaption Layer ("RF_AL"), and a RF Physical Layer ("RF_PHY"), and several sub-layers within each layer. The RF_AL in the transmit direction performs segmenting and encoding operations. In the receive direction, the RF_AL receives the burst data, generates a map of errors, and reconstructs the data if possible.

The RF_PHY receives data units from the RF_AL, prepares and transmits the data units in a series of bursts, receives the bursts or a portion thereof in a receiving station, processes whatever packets are received, and supplies the received information to the RF_AL. The RF_PHY is divided into two sublayers: the RF Transmission Convergence ("RF_TC") Sublayer and the RF Physical Media Dependent ("RF_PMD") Sublayer. The RF Physical Media Dependent Sublayer ("RF_PMD") is responsible for sending and receiving bits over the RF media.

The RF Transmission Convergence Sublayer ("RF_TC") performs several functions. In the transmit direction, it takes each RFAL_PDU and RFAL_ECDU and builds a Burst Protocol Data Unit ("B_PDU"). After the RF_TC determines that its intended transmission is clear for transmission by performing operations in the CARRIER SENSE state, it then enters the TRANSMIT state. While in the TRANSMIT state, the preamble including a synchronization field ("SYNC_FLD") and a framing field ("FRM_FLD") is added to the B_PDU. These bits are then passed to the RF PMD.

In the receive direction, the RF_TC Scans the Hop Group (HOP_GRP) looking for a B_PDU framing sequence from the RF_PMD. After it detects the framing sequences and begins receiving a valid B_PDU, it enters the RECEIVE state in which the RF_TC layer synchronizes with the transmission and attempts to receive the other four B_PDUs. After the RF_TC has attempted to receive the full set of B_PDUs, it will strip off the B_PDU formatting to reveal any of the RFAL_PDUs and the RFAL_ECDUs it received. It then will pass the RFAL_PDUs and RFAL_ECDUs to the RF_AL with the BCH flag fields. The RF_AL then uses the BCH flag fields to create a forward error correction reconstruction map, and reconstructs the data if possible.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a block diagram illustrating a plurality of stations in a communication network.

FIG. 2 is a block diagram of circuits within each station.

FIG. 3 illustrates a RF band divided into a plurality of frequencies, each representing a channel.

FIG. 8 illustrates the data structure within a burst protocol data unit header field ("B_PDU HDR").

FIG. 9 is the format of a RF_TC B_PDU that is sent from the RF_TC sublayer to the RF_AL for reconstruction.

FIG. 10 is a reconstruction map created in the RF_AL.

FIGS. 18A and 18B are flow charts of operations to encode, transmit, receive, decode, and reconstruct a packet.

DETAILED DESCRIPTION OF THE PREFERRED EMBODIMENT

Figure 4:
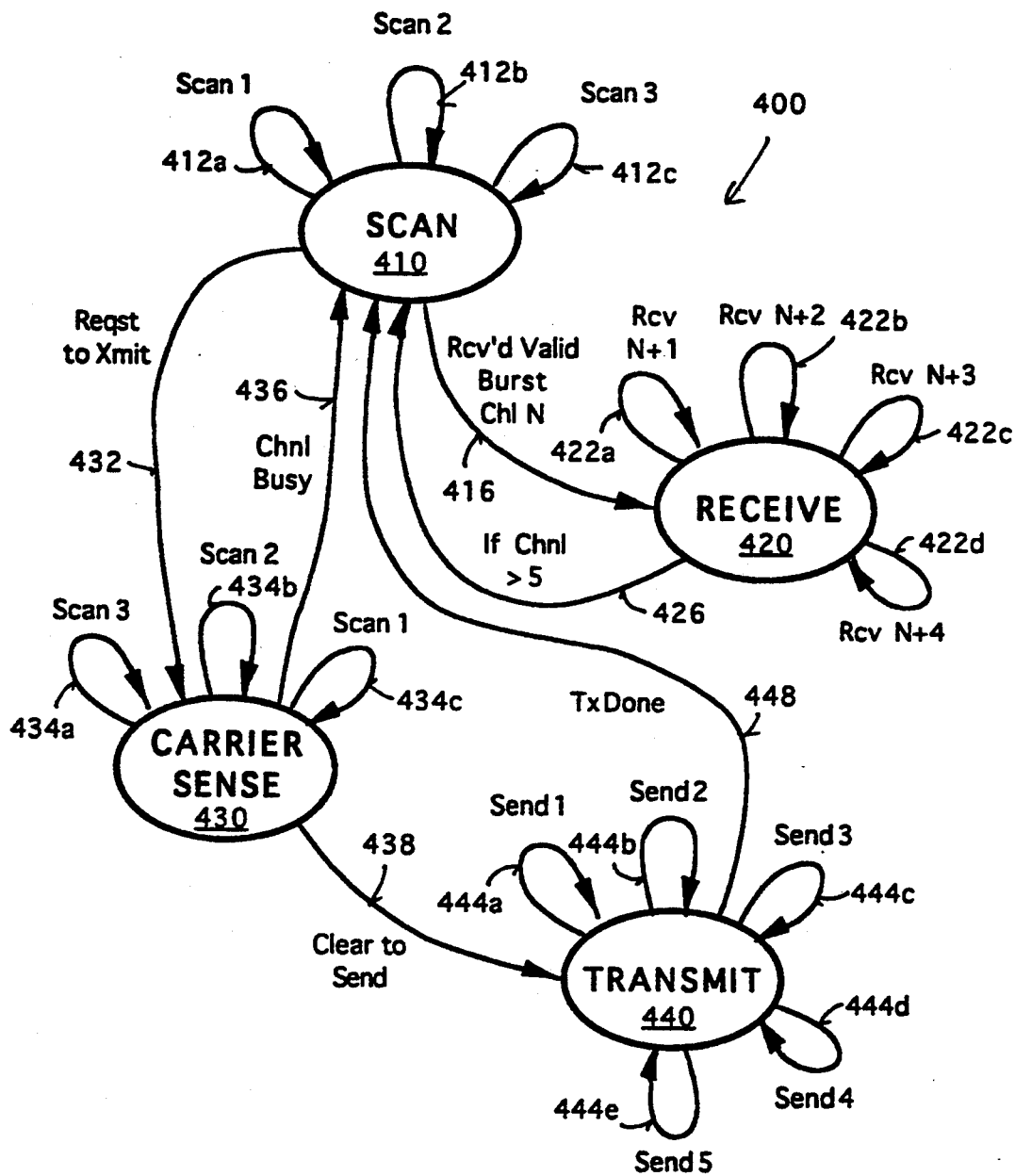
FIG. 4 is a state diagram illustrating four states of the protocol engine: a SCAN state, a RECEIVE state, a CARRIER SENSE state, and a TRANSMIT state.

The following description utilizes acronyms to describe the preferred embodiment. Particularly, the acronyms may refer to layers, components, data segments and other useful features. Appendix A is a table that lists the meaning of each acronym. Furthermore, a number is associated with each acronym in order to more clearly designate its meaning.

FIGS. 1 through 18B disclose various embodiments of the present invention for purposes of illustration only. One skilled in the art will readily recognize from the following discussion that alternative embodiments of the structures and methods illustrated herein may be employed without departing from the principles of the invention.

I. Overall Communication System

Reference is made to FIG. 1 which illustrates a decentralized environment including a plurality of independent stations at 10. The stations 10 include a first station 12a that has a first antenna 14a and a second antenna 14f, a second station 12b that has antennas 14b and 14g, and an $M^{th}$ station 12e that has antennas 14e and 14j. The second antenna 14f is selected to complement the first antenna 14a; i.e., it is selected to receive transmissions that may be missed by the first antenna 14a. Each station 12a–12e is a stand-alone computer, a peripheral, or any device for which communication would be useful. Although only five stations are illustrated in FIG. 1, for many computer applications the number of stations (M) is expected to be in the range of 2–30. However, it will be apparent that in other embodiments many more stations can be accommodated; i.e., M can be very large.

II. Description of a Station

Reference is made to FIG. 2 which illustrates the station 12a that includes a computer processing unit 16 that communicates via an interface 17 with a communications system 18. The antennas 14a and 14f are connected to a radio frequency (RF) modem 20 within the communications system 18. The RF modem 20 includes a conventional transmitter 22 and a conventional receiver 24. A RF control unit 26 is connected to the transmitter 22 and the receiver 24, for controlling operation therein. The transmitter 22 includes conventional circuits for modulating a frequency selected by the RF control unit 26. The receiver 24 includes conventional circuits for demodulating a received RF signal at a frequency selected by the RF control unit 26. The RF transmitter 22, receiver 24, and control unit 26 are connected to a frequency synthesizer 28 which determines the frequency received and transmitted by the transmitter 22 and receiver 24. The frequency synthesizer 28 is capable of generating frequencies $f_1, \ldots, f_R$. The antennas 14a and 14f are capable of receiving and sending transmissions on frequencies $f_1, \ldots, f_R$.

Reference is briefly made to FIG. 3 which illustrates a RF band that is divided into a plurality of frequencies $f_1, \ldots, f_R$. As described herein, a data packet is divided into a plurality of bursts, and each burst is sent at any sequence of these frequencies. Thus, each of the frequencies $f_1, \ldots, f_R$ can also be understood as a channel for sending and receiving data. The frequency is selected by the RF control unit 26 using control signals received on a set of control lines 36. Thus, a program in a LAN controller 40 to be described can be utilized to hop through the frequencies in a pre-selected sequence. For example, if the RF bandwidth is 500 MHz, and each channel uses 10 MHz, then the RF band has fifty channels (R=50). The transmitted packet can be divided into a lesser number of N bursts, (for example, N=5), which is termed a "hopping group". The five frequencies of the hopping group can include any of the fifty frequencies in any order, which is termed a "hopping sequence". All networked stations have a defined hopping group and hopping sequence that is programmed into the station and controlled through the control lines 36 so that the frequency synthesizer 28 hops sequentially through each of those frequencies to transmit or receive a packet. The same principles apply to scanning, except that fewer frequencies are scanned and the time spent at each of these frequencies is substantially less than the time necessary to receive a complete burst. Furthermore, for scanning, the receiver unit 24 includes a means for detecting the presence of a transmission on the scanned frequencies. Status information is provided from the RF control unit on lines 38.

Referring back to FIG. 2, the communications system 18 includes a wireless Local Area Network (LAN) controller 40 coupled between the RF modem 20 and the computer processing unit 16. All processing of packet data takes place in the LAN controller 40. The LAN controller 40 includes control logic 42 to interface to the RF modem 20, and a protocol engine 44 that performs all operations on packets. The protocol engine 44 includes a processor 46, a Read Only Memory (ROM) 48, and a Random Access Memory (RAM) 50 to perform the communication functions prescribed for it. When a packet is to be sent, the protocol engine 44 performs steps to encode the packet and arrange it into a series of bursts for transmission, as will be described in detail. When a packet is received, the protocol engine 44 performs steps to decode whatever bursts or portions thereof are received and attempts to reconstruct the packet, as will be described in detail.

The LAN controller 40 includes a serial-to-parallel converter 60 for passing data between the RF modem 20 and the LAN controller 40 on a serial data line 62. Particularly, the RF modem 20 sends a serial bit stream to the LAN controller 40 when receiving a packet, and receives a serial bit stream from the LAN controller 40 when sending a packet. Any or all of the circuitry for the protocol engine 44, the control logic 42, and the serial-to-parallel converter 60 can be implemented by custom hardware such as an ASIC chip. Additional circuitry in the RF modem 20, such as circuitry to implement the receiver 24 could also be included therein. The ASIC chip could perform operations designated by the RF_TC sublayer described in detail elsewhere.

RF Data Transport Protocol: Overview of Layers and Sub-Layers

Any communication system can be viewed as a protocol stack having many different layers. At the highest layer, the application layer, the message can be treated as a single document even though it may include a very large number of bits. The lowest layer is the physical layer, which includes, for example, hardware in each station to send and receive bits. In between the application layer and the physical layer, additional protocol layers include techniques to divide the messages into shorter bit strings called "packets" that are individually transmitted and then reassembled into messages at the destination. These techniques include the use of protocols to encode and decode the packets.

One Medium Access Control ("MAC") protocol for encoding and decoding packets is described in the patent application cross-referenced above, entitled "Scanning Method for Receiving a Transmission in a Communication System with Slow Frequency Hopping and Coding" by Paulette R. Altmaier and Peter J. Potrebic. The following describes a RF Data Transport Protocol that can be used with the scanning method described therein.

The RF Data Transport Protocol receives a packet of data from the MAC layer in a transmitting station, and performs operations necessary to prepare the packet for transmission, transmit it from the transmitting station, receive it in a receiving station, and supply the received packet to the MAC layer in the receiving station. The RF data Transport Protocol can be described in terms of two layers and several sub-layers within each layer:

RF Adaption Layer ("RF AL")
    RF_AL Segmentation and Reassembly sub-layer
    RF_AL Protocol Data Unit Generation and Recovery sub-layer
    Forward Error Correction Generation and Verification sub-layer
RF Physical Layer ("RF PHY")
    Transmission Convergence sub-layer ("RF_TC")
        Header BCH generation and verification
        Data BCH generation and verification
        RF Transmission Framing and Framing Recovery
        RF Hopping Protocol
            Scanning & Data Reception
            Carrier Sense and Data Transmission
    Physical Media Dependent sub-layer ("RF_PMD")

The RF Adaption Layer ("RF_AL") performs segmenting and encoding operations in the transmit direction. In the receive direction, the RF_AL receives the burst data, generates a map of errors, and reconstructs the data if possible. The RF_AL layer is discussed later in more detail.

The RF Physical Layer ("RF_PHY") receives data units from the RF_AL, prepares and transmits the data units in a series of bursts, and receives the bursts or a portion thereof in a receiving station, processes whatever packets are received, and supplies the received information to the RF AL. The RF PHY is divided into two sublayers: the RF Transmission Convergence ("RF_TC") Sublayer and the RF Physical Media Dependent ("RF_PMD") Sublayer. The RF Transmission Convergence Sublayer, discussed later in more detail, prepares the data units (the RFAL_PDUs and RFAL_ECDUs) for transmission and is also responsible for implementing the RF Hopping Protocol. The RF Physical Media Dependent Sublayer ("RF_PMD") is responsible for sending and receiving bits over the RF media. The RF_PMD sublayer includes hardware such as the RF modem 20 and antennas 14a and 14f described with reference to FIGS. 1, 2 and 3.

The following section will describe in detail the RF Hopping Protocol in the RF_TC sublayer.

The RF Hopping Protocol

The following section describes in detail the implementation of the RF Hopping Protocol. Often, exact quantities are specified for clarity of explanation. For example, there are "five" frequencies in a hopping group, and "three" of these are scanned frequencies. It should be apparent that these quantities are illustrative and not restrictive of the invention and that more or fewer frequencies could be used.

As described above with reference to FIG. 3, the RF spectrum is divided into multiple channels or frequencies. These channels are grouped into multiple sets of five unique channels, each set of which is called a Hopping Group ("HOP_GRP"). The RF Hopping Protocol controls the Wireless LAN to sequence through each frequency in the HOP_GRP during a specified period of time in accordance with a predetermined Hop Sequence. Thus, data can only be transferred between MAC Protocol entities operating with the same HOP_GRP and Hop Sequence. This advantageously allows multiple Wireless LANs to operate in the same spectrum without interference from each other providing they operate in different Hop Groups, or even in the unlikely instance that the same Hop Group is being utilized by two networks, there will be no interference, if they operate at different points in time within the Hop Sequence. Even if a station in a first network were to receive a transmission by another network, a header in the received data includes a LAN ID that can be used to discern and ignore the message.

Data transmission takes place by transmitting each of the five bursts data units CB_PDUs") associated with a single packet ("MAC_PDU"), one burst per frequency in the HOP_GRP. Specifically, the first burst will be transmitted on channel #1, the second burst on channel #2, and so on. As will be described in more detail with reference to FIGS. 5-8, each burst includes a burst data unit "B_PDU") and a preamble. The preamble includes a synchronization field ("SYNC_FLD") and a framing field ("FRM_FLD"). The receiver 24 (FIG. 2) scans the first three channels in the same HOP_GRP looking for a burst. Specifically, the receiver 24 looks for a SYNC_FLD and a FRM_FLD indication (i.e., a preamble) on any one of the first three channels. If the receiver is successful at synchronizing with the transmitter 22 on any one of the first three scanned frequencies, it then sequences the receiver 24 through the HOP_GRP to receive the remainder of the five bursts.

There are many advantages of this RF Hopping protocol. First, the receiver 24 need hear only one of the first three bursts to become synchronized with the transmission. Once synchronized, the receiver 24 knows when to expect the next burst on the next channel of the HOP_GRP. If the receiver 24 receives at least three of the five bursts fully intact, then it can always reconstruct the packet. For example, interference might cause the receiver 24 not to hear the first and second burst of a transmission but the receiver 24 can still be successful if it hears and receives the third burst which allows it to receive the fourth and fifth bursts. In a different interference scenario, the receiver 24 could hear the first burst, synchronize with the transmitter 22, miss two of the next four bursts because of interference but still rebuild the packet.

RF Hopping Protocol State Machine: Overview of Operational States

Reference is now made to FIG. 4. The RF Hopping Protocol State Machine 400 has four high level states: a SCAN state 410, a RECEIVE state 420, a CARRIER SENSE state 430, and a TRANSMIT state 440. The SCAN state 410 and RECEIVE state 420 respectively listen for and receive data. The CARRIER SENSE state 430 and the TRANSMIT state 440 relate to data transmission. FIG. 4 is a high level state diagram showing some of the events which drive the protocol and illustrating interactions between the states 410, 420, 430 and 440. Each of these states has fixed operational requirements to which the protocol must adhere for proper operation. The following discussion gives a general overview of these states. In a following section, each state is described in more detail. The states 410, 420, 430, and 440 are implemented in the protocol engine 44, software, and related circuitry in the RF modem 20. Additional states may be useful to allow for reduced power consumption, lower overhead, etc.

The default state of the protocol engine 44 is the SCAN state 410. When in the SCAN state 410, the RF Hopping Protocol continually scans (or listens) for data on the first three channels of the HOP_GRP as indicated by lines 412a, 412b, and 412c. If a transmission is detected on any of these three channels, the SCAN state 410 will attempt to synchronize to receive the transmitted message and to recover the burst data on that channel. Successful synchronization of the receiver 24 to the transmitted burst requires successful reception of the framing field and the burst header ("B_BPU HDR") 712, and also requires that the burst header 712 is error-free. An error-free header 712 provides the protocol engine 44 with a valid length field for this burst and the remaining bursts in the transmission. The length field therefore provides a time measurement means to synchronize with the next burst on the next channel and all remaining bursts and channels of the current transmission.

After the protocol engine 44 determines it has recovered a valid first burst, it will advance as illustrated by a line 416 from the SCAN state 410 to the RECEIVE state 420. Once the protocol engine 44 receives the synchronization field and the framing field, the receiver knows how to receive each of the bursts. Therefore, in the RECEIVE state 420, the protocol engine 44 is synchronized with the transmission and will therefore hop sequentially through each of the channels in the predetermined hop sequence as illustrated by lines 422a-d. If some interference causes a subsequent burst to be missed, the RECEIVE state 420 will insert an erasure delay which simulates the length of the complete burst so that synchronization is maintained between the transmitting and receiving nodes during lost bursts. After the protocol engine 44 receives (or fails to receive) the fifth burst, it will return to the SCAN state 410 on a line 426.

When a station 12a (FIG. 2) is in the SCAN state 410 and wants to transmit, a Request to Transmit (RQST_XMIT) signal is submitted to the transmitting station's protocol engine 44. At the end of each scan 412a-c during the SCAN state 410, the protocol engine 44 checks for a pending RQST_XMIT signal. If set, the protocol engine 44 moves the system from the SCAN state 410 along a line 432 to the CARRIER SENSE state 430. The purpose of the CARRIER SENSE state 430 is to determine if any other node has begun transmitting first. As illustrated by lines 434a-c, the CARRIER SENSE state 430 scans downward in a sequence of channels 3, 2 and 1. This sequence beginning with line 434a and then continuing with lines 434b and 434c, is the reverse of the scan sequence used by the protocol engine 44 when scanning in the SCAN state. If the protocol engine 44 detects valid data which might be a synchronization field, framing field, or any portion of a burst, it will declare the channel BUSY. As illustrated by a line 436, it will then abort the CARRIER SENSE state 410 and return to the SCAN state 410. In the SCAN state 410 it will attempt to recover the burst, and perform other operations in accordance with that state.

When the CARRIER SENSE state 430 has finished scanning each of the first three channels in reverse order and has detected no preamble or burst data on any of these channels, the protocol engine 44 advances from the CARRIER SENSE state 430 along a line 438 to the TRANSMIT state 440. At this time the protocol engine 44 will begin transmitting each of the five bursts generated by the RF_TC sub-layer as illustrated by lines 444a-e. When the TRANSMIT state 440 has completed transmission of a packet, the protocol engine 44 returns along a line 448 to the SCAN state 410.

IV. Encoding and Segmenting

The following discussion describes operations performed in the RF_AL layer and the RF_TC sublayer. The operations in the RF_AL and RF_TC are performed in the protocol engine 44 to process a packet (a "MAC_PDU") into a series of bursts CB_PDUs"), each of which will eventually be transmitted on a different frequency (channel) in the hop sequence of a predetermined HOP_GRP. The length of each burst depends on the packet length, and will vary from packet to packet. The portion of the packet transmitted on a single frequency, which corresponds to a row of the matrix, is called a burst. Preceding each burst, a preamble is used to provide synchronization and framing information. The individual fields in each burst are explained below.

Figure 5:
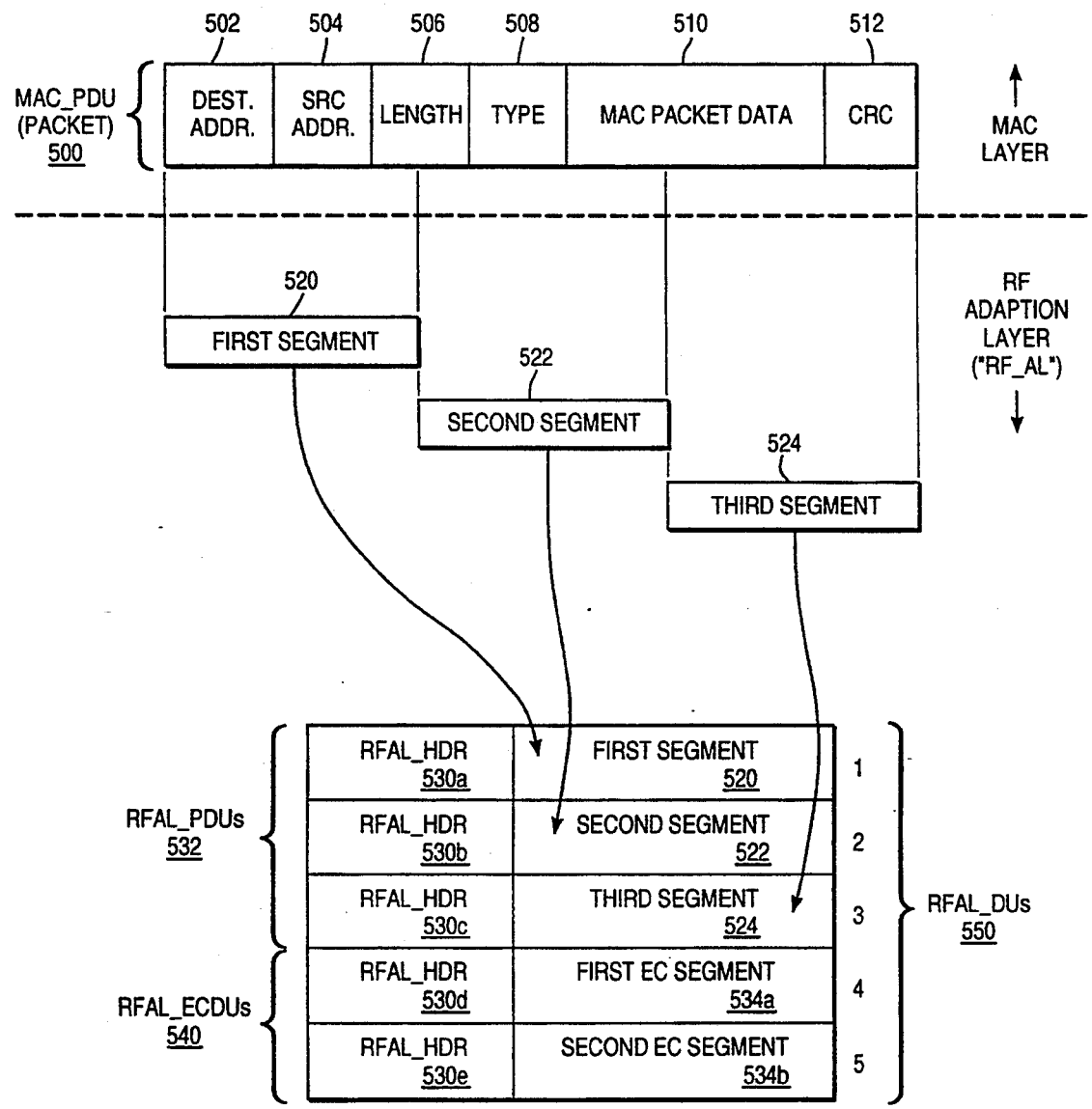
FIG. 5 is a diagram illustrating segmenting operations occurring in the RF_AL layer.

Reference is now made to FIG. 5 which is a diagram illustrating operations within the RF_AL. A packet of data 500 is supplied from MAC layer, which is implemented in the CPU 16 (FIG. 1). The packet 500 may have a standard format. In the preferred embodiment, the described packet 500 has a format of the IEEE Standard 802.2 or 802.3. For example as illustrated the packet 500 includes fields including a destination address 502, a source address 504, a length 506, a type 508, medium access control ("MAC") packet data 510, and a 32-bit CRC code 512 for error protection. The size of the packet 500 is flexible: the packet 500 may have a size between 0 and 754 bits in the described embodiment. Specifically, a packet 500 has a length "M" where "M" is an integer ($0 \leq M \leq 753$). The integer "M" must also be such that "M" MOD 3=0. Of course, in other embodiments, larger packet sizes could be used.

The packet 500 is segmented into a plurality of segments, each segment having an equal length "S". In the described embodiment, the packet 500 is divided into three segments and therefore $S = M \div 3$. The segmenting operations are the first operations performed in the RF Adaption Layer ("RF_AL"). Physically, the operations are performed in the protocol engine 44. In the preferred embodiment, five bursts are formed from a packet of data up to 753 bits in length. In other embodiments, other packet sizes and different numbers of bursts could be utilized.

After segmentation, the RF_AL forms each RF_AL segment 520, 522, and 524 into a RFAL_PDU 532, by adding a 4-byte RF_AL Header ("RFAL_HDR") 530 to the front of each RF_AL segment 520, 522, and 524. The RFAL_HDR 530 includes information such as the time stamp and a LAN ID that is useful at the MAC layer for purposes such as timing and coordination for networking purposes.

The combination of each segment 520, 522, and 524 together with its respective header 530a, 530b, and 530c provides three RF_AL Protocol Data Units ("RFA- L_PDUs") 532. Particularly, the combination of the first segment 520 with the RFAL_HDR 530a provides a first RFAL_PDU 532, the combination of the second segment 522 with a second RFAL_HDR 530b provides a second RFAL_PDU 532, and the combination of the third segment 524 with the third RFAL_HDR 530c provides a third RFAL_PDU 532. The resulting length of each RFAL_PDU is designated by "L" which is equal to the length "S+4" because the headers 530a-c each have four bytes.

Error correction for the three segments 520, 522, and 524 is provided by two error correction segments 534, including a first EC segment 534a and a second EC segment 534b. The EC segments 534a-b are built from the three segments 520, 522, and 524. Each EC segment 534a-b includes forward error correction information constructed in accordance with a Reed-Solomon code for rebuilding the segments 520, 522, and 524, in the event that any are lost or in error. Particularly, the Reed-Solomon code corrects errors in bytes aligned in like positions, i.e., along columns (see FIG. 6). The aligned bytes are corrected in byte units which can vary in size from one up to the fragment size (discussed subsequently with reference to FIG. 6). For example, the first EC byte units in the EC segments 534a-b corrects errors in the first data byte units of the first, second, and third segments 520, 522, and 524.

A RFAL_HDR 530d is added preceding the first EC segment 534a to provide a first RFAL_ECDU 540. A fifth RFAL_HDR 530 is added preceding the second EC segment 534b to provide a second RFAL ECDU 540. All RFAL HDRs 530a-e have the same format which has been described previously. The RFAL_DUs 550 are defined to include the combination of the three RFAL_PDUs 532 and the two RFAL ECDUs 540.

The forward error correction (the "Reed-Solomon") scheme encoded in the RFAL_ECDUs 540 is designed so that only three of the RFAL_DUs 550 must be received directly by a receiving station in order for the receiving node to reconstruct that MAC_PDU packet 500. Particularly, the error correction scheme is designed so that if three of the five fragments 600 (see discussion of fragments with reference to FIG. 6) aligned in a column along any given fragment position are received, the receiving station can still reconstruct the three data fragments 600 in the RFAL_PDUs 532.

The RFAL_DUs 550 are sent by the RF_AL to the RF_PHY layer for transmission. Typically the RFAL_DUs 550 will be transmitted in the order shown in FIG. 5, beginning with the first RFAL_PDU 532 and ending with the second RFAL_ECDU 540. Each RFAL_DU 550 has a length "L", which, due to the variable size of the packet 500 that is divided into three segments, is an integer ($4 \leq L \leq 255$).

The RF Transmission Convergence Sublayer CRF TC")

The RF_TC sublayer is a sublayer of the RF_PHY layer. The RF_PHY layer, as discussed previously, performs operations to receive the data units 550 from the RF_AL, process them, transmit them to another station, receive at least a portion of the data units, process them further, and then supply the received data units back to the RF_AL.

The RF_TC sublayer receives the five RFAL_DUs 550 from the RF_AL. The RF_TC sublayer prepares these RFAL_DUs 550 for transmission by taking the length "L" and the RFAL_DUs 550 it receives from the RF_AL and converts them to a Burst Protocol Data Unit ("B_PDU") 710, to be described. The B_PDU 710 includes two parts: a B_PDU Header ("B_PDU HDR") 712 and the B_PDU DATA 620.

Figure 6:
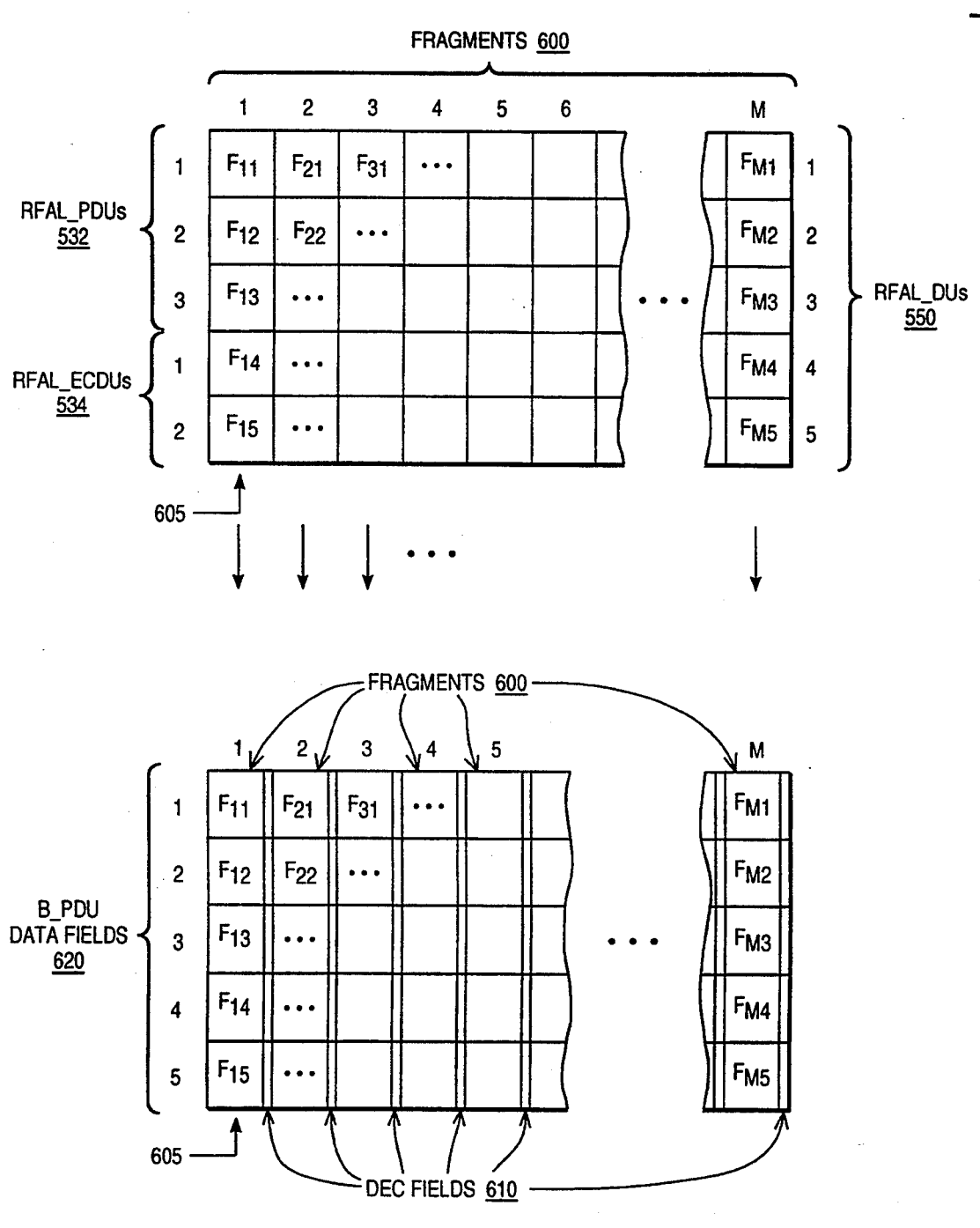
FIG. 6 is a diagram illustrating operation in the RF_TC sublayer to prepare data units ("DUs") for transmission, including encoding the DUs and adding preambles.

Reference is now made to FIG. 6 which illustrates operations to construct the B_PDU_DATA field 620 from the RFAL_DUs 550. The RFAL_DUs 550 are divided into subunits called "PDU fragments" illustrated generally at 600. For each RFAL_DU 550, the fragments 600 are numbered from 1 through M. For example, for the first RFAL_DU 550, the first fragment is labeled "$R_{11}$", the second fragment 600 is labeled "$R_{21}$", and so forth. A "column" of fragments 600, illustrated generally by an arrow 605, is defined by fragments in like positions across segments. For example, the first column 605 includes fragments $F_{11}, F_{12}, F_{13}, F_{14}$, and $F_{15}$. The fragments $F_{14}$ and $F_{15}$ in the RFAL_ECDUs 534 include a Reed-Solomon error correction code to correct errors in the fragments $F_{11}$, $F_{12}$, and $F_{13}$ in the RFAL_PDUs 532.

For each packet 500, the number "M" of fragments 600 within any RFAL_DU 550 will vary, depending upon packet size. Because each data fragment 600 is 14 bytes or less and each B_PDU DATA field 620 cannot exceed 255 bytes, therefore the largest number of fragments 600 within a B_PDU DATA field 620 equals "19" (i.e., $M \leq 19$). And because the length "L" of the RFAL_DUs 550 can be any integer within a range from 0 to 255, the data in the final B_PDU fragment 600 may include a number of bytes less than the full fourteen bytes of the other fragments 600.

In the preferred embodiment, it is convenient to use a 14-byte data fragment 600 because that length corresponds to a convenient subunit in the BCH error correction scheme which is a well-known scheme for correcting random errors. Each fragment 600 includes a 14-byte field of data from the RFAL_DU 550 and is associated with a 1-byte Data Error Control ("DEC") field 610. The DEC field 610 includes an 8-bit BCH code that detects errors in its related fragment 600. For example, for the first fragment ($F_{11}$) in the first RFAL_PDU 532, the first DEC field 610 is formed in such a manner to allow detection of errors within that field. In other embodiments, the DEC field 610 may include information to correct errors in its related fragment 600. In still other embodiments, each fragment 600 may include a larger or smaller number of bytes, for example twenty-eight bytes or some other number suitable for the error correction.

Figure 7:
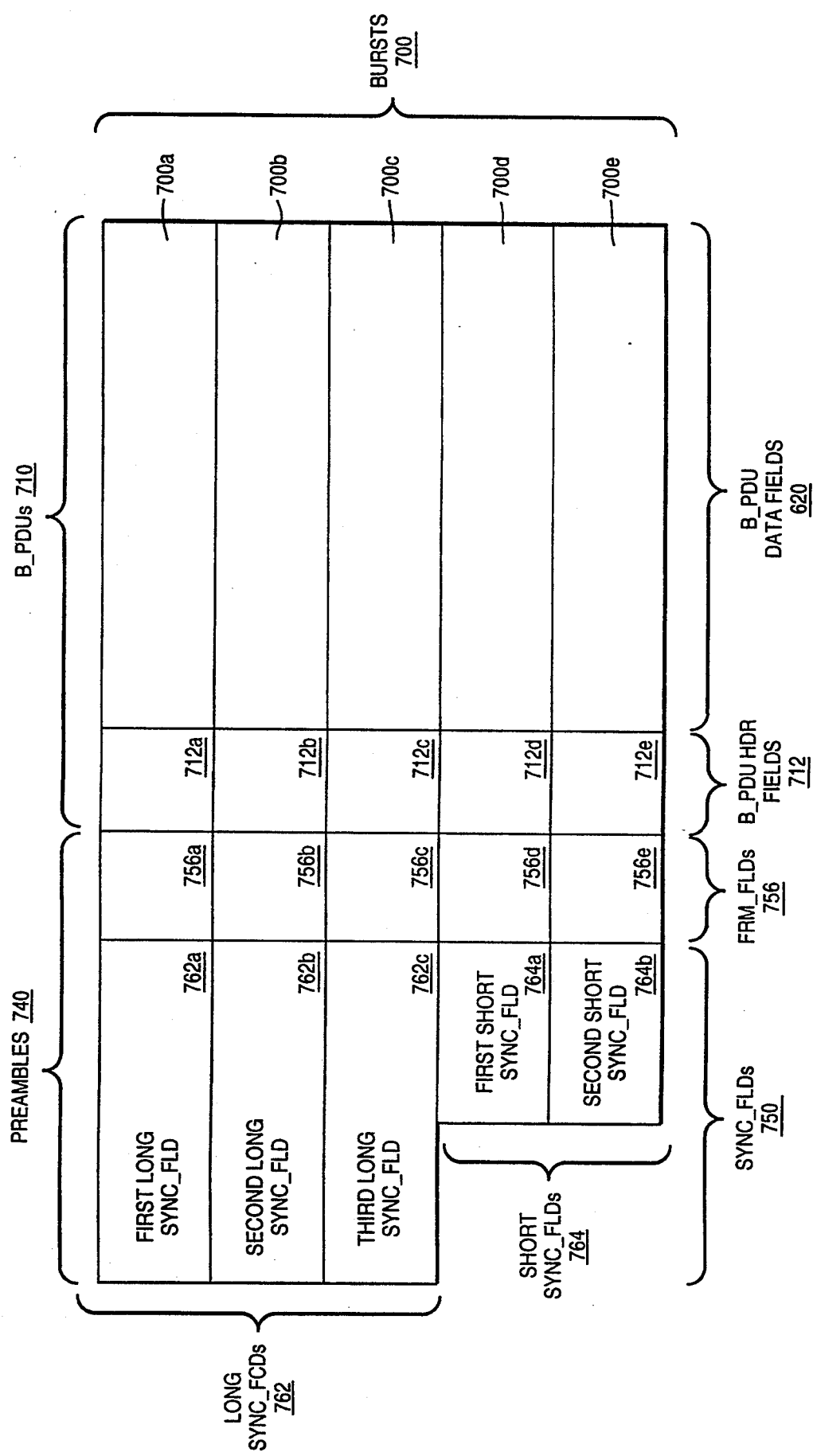
FIG. 7 is a diagram of the structure of a series of bursts that are created in the RF transition conversion sublayer and supplied to the physical media dependent ("RF_PMD") sublayer.

Reference is now made to FIG. 7 which illustrates a plurality of bursts 700 that are formed from the B PDU data fields 620. Each burst includes B PDUs 710 each of which includes a B_PDU data field 620 and a B_PDU HDR field 712.

Reference is briefly made to FIG. 8 which illustrates the data structure for a B_PDU HDR field 712. The first field 720 is a reserved byte in the current implementation. A second field 722 is the length field which includes the value of "L", which is an integer in the range of 0 through 255 that equals the length of the RFAL_DUs 550. A third field 724 is called the Header Error Control (HEC) field 724 which includes a 16-bit BCH code produced to detect an error in the first two fields 720 and 722 in the B_PDU HDR 712.

Reference is again made to FIG. 7. Each of the bursts 700 are utilized by the RF Hopping Protocol, discussed previously in detail. To be usable by the RF Hopping Protocol, preambles 740 are added preceding each of the B_PDUs 710.

The preambles 740 include two types of fields: a SYNC field ("SYNC_FLD") 750 and a FRAME field ("FRM_FLD") 756. Each SYNC_FLD 750 includes a fixed number of SYNC symbols and each FRM_FLD 756 includes one FRAME symbol. (A symbol is a set of bits of a known length). The SYNC symbol is used primarily by the RF_PMD in the receiving station to recover the bit clock and data. It also can be used by the receiving station to identify that the data stream is that of the preamble 740 and not the B_PDU 710. In addition, the distinctiveness of the preambles 740 allows the receiving station to use the preamble 740 to distinguish a friendly transmission (i.e., one using the same protocol) from a foreign transmission.

The frame symbol in each FRM_FLD 756 is a sequence of bits used to signal the start of the B_PDU 710. The frame symbol is selected to be unique enough that when coupled with a fixed number of good SYNC symbols the probability that the resulting pattern will happen to be found in the data of the B_PDU 710 is extremely low.

The SYNC FLDs 750 have two versions as illustrated in FIG. 7: a first SYNC_FLD version 762 which precedes each of the first three B_PDUs 710 to be transmitted and a second, shorter SYNC_FLD version 764 which precedes the last two B_PDUs 710 to be transmitted.

The longer first SYNC_FLD version 762 is useful for the first three bursts 700 because they are transmitted on channels which are scanned by the receiving stations. Particularly, the longer SYNC_FLD 762 has more SYNC symbols to allow a receiving station more time to detect and receive the burst 700 to which it is attached. The shorter preambles 764 are used on the frequencies not scanned because the receiving station already knows to expect them.

The five bursts 700 in the format described with reference to FIG. 7 are then supplied to the RF_PMD, which is the physical layer that transmits the bursts 700. The bursts are transmitted in the sequence specified in FIG. 7, particularly, from the first burst 700a through the fifth burst 700e. The bursts 700 are sent using the RF Hopping Protocol described previously. In a perfect environment, each of the bursts 700 would be received error-free at the receiving station. However, due to interference, fading, or other causes less than all of the bursts 700 may be received, and each of the bursts that are received may be partially incorrect.

Reception of Bursts 700 in the RF TC

The following discussion relates to operations performed in the RF_TC layer to examine incoming data to determine whether or not it is a burst 700.

A framing verification step is performed if a receiving station receives a signal on a channel. The verification step includes looking at the data pattern received on a channel and attempting to recognize it; i.e., determining if the pattern is data, or SYNC, or FRAME symbols. If there is no data, no SYNC, and no FRAME symbols, the SYNC state machine returns sync done (SYNC_DNE). If the SYNC state machine finds data but does not recognize a SYNC_FLD or a FRM_FLD, it returns a SYNC_DNE signal with a SYNC_BSY flag to indicate that the channel was busy. However, if the SYNC state machine finds the SYNC FLD it will return a SYNC indicator and continue until the FRM_FLD is received. At this point the frame recovery of the B_PDU can begin.

Upon the reception of the first potentially valid B_PDU_HDR 712, the RF_TC calculates the BCH code of the received header 712 and compares it with the BCH code transmitted in the HEC field 724 of the B_PDU_HDR 712. If they match, the B_PDU_HDR will be declared valid and the length field 722, including "L" will be saved. However, if the BCH check fails for the first received burst, the entire B_PDU 710 following will be ignored. If the B_PDU 710 is not the first burst to be received, then the RF_TC will mark the B_PDU_HDR 712 as bad but can continue to receive the B_PDU DATA field 620 because it knows of each length "L" B_PDU 710 from the previously received burst.

After a B_PDU_DATA field 620 has been received the RF_TC begins a B_PDU data verification process. Data verification is done over every fragment 600 in the B_PDU_DATA by calculating a BCH code for each data field of the fragment 600 and comparing it with the received BCH code in the DEC field 610. If the received DEC field 610 matches the calculated BCH code, the fragment 600 will be marked "good". If the check fails, the fragment 600 will be marked "bad". The data verification process continues for each fragment 600 in each RFAL_DU 550.

Reference is now made to FIG. 9. When the RF_TC receives a completed B_PDU 700 and has completed BCH verification of the header field 712 and all data fragments 600 in the B_PDU data fields 620, it returns a RF_TC B_PDU 900 to the RF_AL using the format as shown in FIG. 4.4.

For each received burst 700, one RF_TC B_PDU 900 is sent to the RF_AL. Each RF_TC B_PDU 900 includes four parts: the RF_TC Channel ID field ("RFTC_ID") 910, the reserved bits 720 and length field 722 received from the B_PDU_HDR field 712, the received B_PDU Data field ("B_PDU_DATA") 620, and the BCH Flag field ("BCH_FLG"). The fields 720, 722, and 620 include received data, which may not correspond exactly to the transmitted data.

The RFTC_ID field 910 designates the channel in the HOP_GRP in which this B_PDU 700 was received. The RFTC ID field 910 can be useful because less than all bursts may have been received because of interference. The channel ID field 910 is used to identify each burst and thereby aid the RF_AL in reconstructing the missing burst. The channel ID field includes a 0, 1, 2, 3, or 4, designating one of the channels 1, 2, 3, 4, or 5.

The received B_PDU HDR field 712 includes the first two bytes of the received B_PDU_HDR 712: the reserved byte 720 and the length "L" byte 722. The DEC fields 610 and the HEC fields 724 are not sent to the RF_AL because they are no longer necessary. The next set of "L" bytes is the received B_PDU Data field (B_PDU_DATA) 620, which is equivalent to an uncorrected RFAL_PDU 532. The RF_TC B_PDU 900 also includes a BCH FLG fields 920, which include a first BCH field 922, a second BCH field 924, and a third BCH field 926. Each BCH field 922, 924, and 926 includes a BCH Flag for each of the fragments 600 within the burst 700. The BCH flags are mapped to the fragments 600 in accordance with the following Table A. If the bit corresponding to a particular BCH field has been set (i.e., marked "bad") during data verification, the indication is that the BCH calculation failed and the associated fragment (or header) is in error. If the BCH calculation is correct, then the bit for that field is clear indicating that the data is "good". The following is Table A for the three BCH Flag fields 922, 924, and 926 for a single burst 700:

TABLE A

| Byte | Bit | BCH Field |
|---|---|---|
| First BCH Field 922 | 7 | Header BCH |
| | 5 | Fragment 1 |
| | 4 | Fragment 2 |
| | 3 | Fragment 3 |
| | 2 | Fragment 4 |
| | 1 | Fragment 5 |
| | 0 | Fragment 6 |
| Second BCH Field 924 | 7 | Fragment 7 |
| | 6 | Fragment 8 |
| | 5 | Fragment 9 |
| | 4 | Fragment 10 |
| | 3 | Fragment 11 |
| | 2 | Fragment 12 |
| | 1 | Fragment 13 |
| | 0 | Fragment 14 |
| Third BCH Field 926 | 7 | Fragment 15 |
| | 6 | Fragment 16 |
| | 5 | Fragment 17 |
| | 4 | Fragment 18 |
| | 3 | Fragment 19 |
| | 2 | always "0" |
| | 1 | always "0" |
| | 0 | always "0" |

If all BCH calculations passed (i.e., all received data is marked "good"), then the three BCH bytes 922, 924, and 926 will contain all "0"s, but if any of the calculations failed (i.e., one or more marked "bad") then a "1" will appear in that slot. For example, if the third data fragment 600 in a B_PDU DATA field 620 was bad, then the third bit in the first BCH Field 922 is set to a "1". Since each data fragment 600 is 14-bytes or less and each B_PDU DATA FIELD 620 cannot exceed 255 bytes, then the largest number of fragments 600 within a B_PDU 700 is 19. Unused bits 2–0 of the third BCH Field 926 are defined to be zero.

Data Reconstruction in the RF Adaption Layer

After the RF_TC sublayer in the RF_PHY has finished receiving all the PDUs for a particular MAC_PDU 500, it passes the RF Transport Convergence Burst Protocol Data Unit ("RF_TC B_PDU") 900 (see FIG. 9) for each burst 700 received. Due to the possibility of missed or incomplete bursts, the RF_TC B_PDU 900 can include any combination of RFA-L_PDUs 532 and RFAL_ECDUs and could number 1, 2, 3, 4, or 5. If the number of PDUs 532 or ECDUs 534 received is only "1" or "2", the RF_AL will clearly not have enough information to reconstruct the MAC_PDU, and no further action is necessary.

Reference is now made to FIG. 10, which is a reconstruction map for an exemplary received RF_TC_B_PDU 900. If the number of received PDUs 532 and ECDUs 534 is three or more, reconstruction operations can still proceed. The RF_AL will construct a map such as that shown in FIG. 10 using information from each of the received RF_TC B_PBUs 900. The first step is to identify which of the PDUs 532 and ECDUs 534 were received. The RF_TC ID field 910 is used to determine this. As shown in the example FIG. 10, there were four RFAL_DUs 500, including two PDUs 532 and two ECDUs 534 received. Specifically, the first and second RFAL_PDUs 532 were received, and the first and second RFAL_ECDUs 534 were received. The third RFAL_PDU 532 was not received.

Next, from the BCH fields 922, 924, and 926, the BCH Flag Field ("BCH_FLG") is used to mark each fragment 600 as "good" or "bad". If every column has at least three "good" fragments, the MAC_PDU 500 can be rebuilt. In the example of FIG. 10, column five has only two "good" fragments. Thus, this exemplary MAC_PDU 500 cannot be rebuilt and the entire packet must be thrown away and re-sent.

There are some time savings steps that can be implemented. For example, if the BCH_FLGs for the first, second and third PDUs are all zero's, no reconstruction is required. Furthermore, if the top three fragments in any position are all "good", no further action is required because the fragments for that position can be reconstructed.

RF Adaption Layer Reassembly

After the RF_AL has completed the error recovery process, the RFAL_ECDUs 534 are no longer necessary and the RFAL_PDUs are disassembled into RFA-L_HDRs 530 and RF_AL segments 520, 522, and 524 as described in reverse in FIG. 5. Then, as shown in reverse in FIG. 5, the RF_AL segments 520, 522, and 524 are re-assembled back into a MAC_PDU 500.

The form of preamble fields 740 is determined by hardware requirements. The purpose of the preamble 740 is to synchronize the hardware in a receiving station to receive data, which requires the following two operations: clock recovery and word-synchronization (i.e., aligning the hardware on a logical boundary in preparation for receiving framing information).

The length of the preambles 740 is determined by the hardware characteristics and by the algorithms executed by nodes when listening. The preamble must be sufficiently long to allow a scanning station to detect the transmission and then to begin receiving the transmitted packet.

RF Hopping Protocol States—Detailed

The following relates to the detailed description of the states in the RF Hopping Protocol that have already been described in more general terms. Specifically, the SCAN state 410, RECEIVE state 420, CARRIER SENSE state 430 and TRANSMIT state 440, discussed previously, will each be described in more detail. In addition, the timing required by each state machine (i.e., within the protocol engine 44) will be detailed so that synchronization between the transmitter and receiver can be achieved. The preamble timing will also be described.

RF Hopping Protocol SCAN State 410

Figure 11:
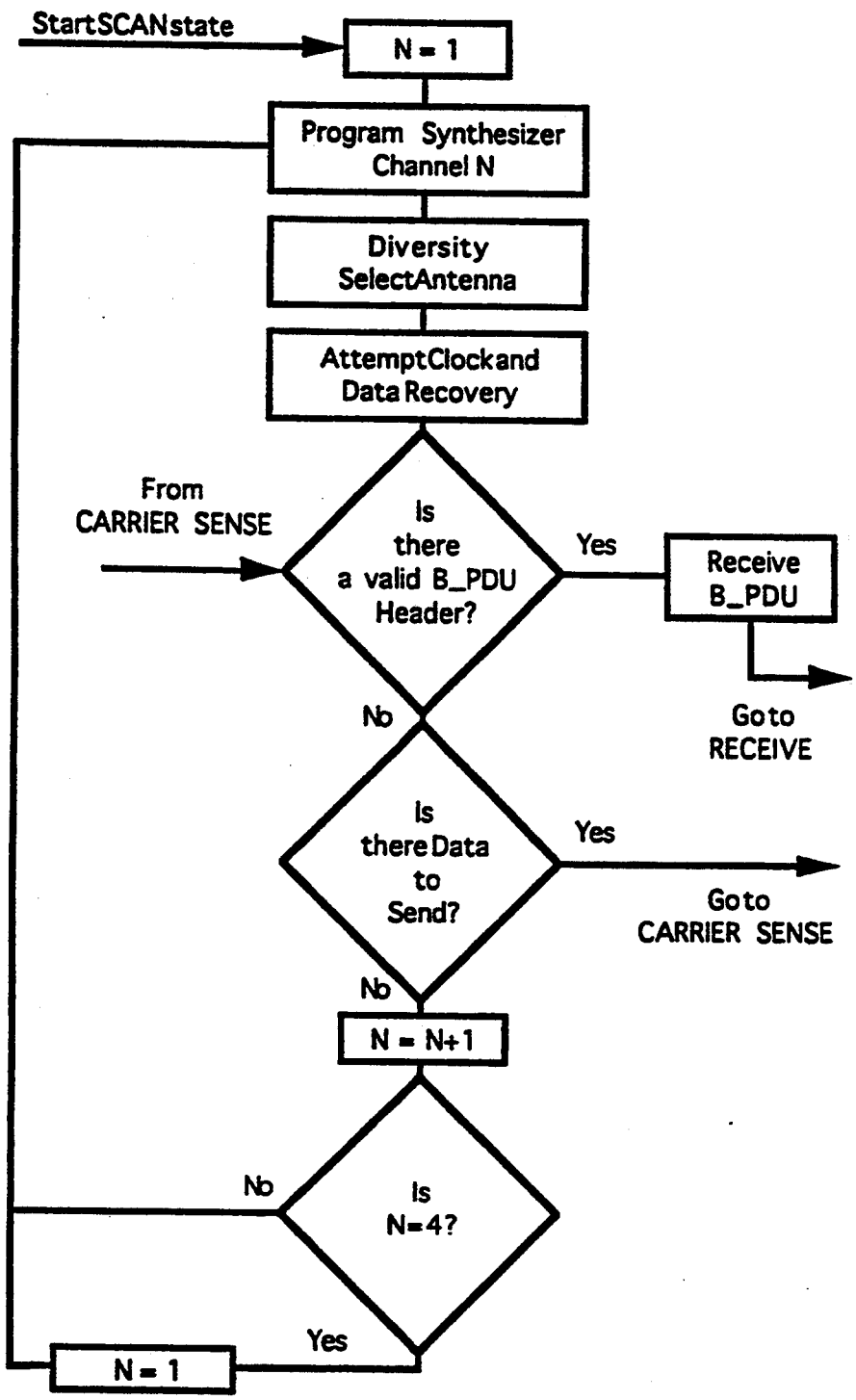
FIG. 11 is a flow chart of the SCAN state.

Reference is now made to FIG. 11. The SCAN state 410 is the default or normal operating state of the RF Hopping Protocol state machine. In this mode, the protocol engine 44 scans through each of the first three channels of the HOP_GRP and listens for transmissions. FIG. 11 shows the flow chart for the SCAN state machine. Whenever the SCAN mode is entered, the channel number "N" is set to 1. The protocol engine 44 then programs the synthesizer of the radio with the frequency of channel 1 in the HOP_GRP. It then waits a period of time called T_PRGM for the radio to settle on the channel. Next the protocol engine 44 performs a diversity function which selects the antenna 14a or 14f (FIGS. 1 and 2) with the best signal. This function requires the radio to wait a period of time called T_DIV. When this function has completed, the protocol engine 44 advances to the clock and data recovery state.

The clock and data recovery function is where the protocol state machine attempts to recover clock and data from the channel. If there is no node transmitting, no clock or data will be detected. If there is valid clock and data, the protocol state machine will look for the SYNC symbol to determine if the data pattern is a SYNC_FLD 762 of a burst 700. If a SYNC_FLD 762 is detected, the protocol state machine will wait for the FRM_FLD 756 and then attempt to receive the B_PDU_HDR 712. There is a time limit for attempting to recover clock and data, and the determination of the data being the SYNC_FLD 762. This time period is specified as the Scan Clock Recovery Time or ("T_SCKR"). If the clock and data recovery function doesn't successfully find the SYNC_FLD 762 after the T_SCKR time period, it will abort the clock and data recovery function. If the SYNC_FLD 762 is found, the T_SCKR period will be ignored and the clock and data recovery function will continue until a FRAME symbol is found. If a FRAME symbol is detected, the SCAN state 410 will attempt to recover the B_PDU_HDR 712. If the B_PDU_HDR 712 is valid, (the HEC field 724 is correct) the protocol engine 44 will receive the B_PDU DATA field 620 and advance to the RECEIVE state 420.

If the T_SCKR period ends without a valid SYNC_FLD 762 being detected or if a B_PDU_HDR 712 is received with an invalid HEC 724, the SCAN state 710 will check to see if there is a RQST_XMIT. If there is, the protocol engine 44 will advance to the CARRIER SENSE state 430. If there is not a RQST_XMIT, the channel number will be incremented and the protocol engine 44 will scan the next channel in the predetermined hop sequence.

Figure 12:
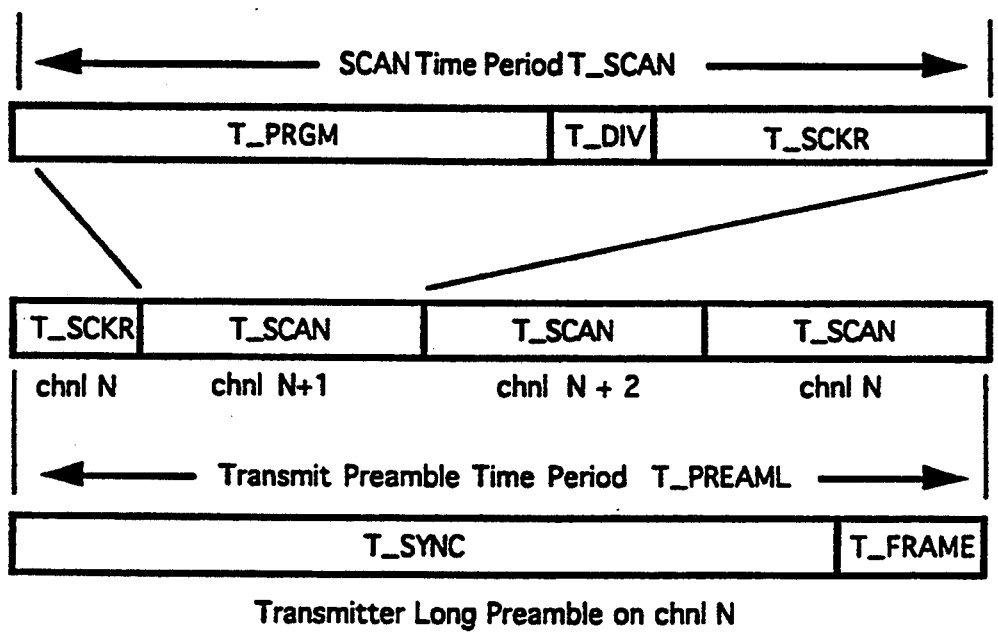
FIG. 12 is an illustration of the relationship between the scanning time and the preamble time.

Reference is now made to FIG. 12, which shows the relationship between the time for scanning one channel (T_SCAN) and the time for the transmitter to transmit a long preamble (T_PREAML). As the top of the FIG. 12 shows, T_SCAN is the sum of several time periods: T_PRGM+T_DIV+T_SCKR. The bottom of FIG. 12 shows the transmission time for a long preamble 740 of time period T_PREAML. The preamble time period T_PREAML is the sum of the time period of the SYNC_FLD 762 (T_SYNC) plus the time period for the FRM_FLD 756 (T_FRAME).

The center of FIG. 12 compares the time it takes a receiver to scan three channels versus a node transmitting a long preamble 740. For example, assume that a node begins transmitting on channel N while a receiver running asynchronously with the transmitting node is trying to recover clock and data on channel N. If the transmitter starts transmitting just long enough after the receiver has started the recovery function, the receiver may not have enough time to complete the functions to detect SYNC on channel N before the T_SCKR time expires. The receiver will then finish the scan on channel N and proceed to N+1, and then to N+2 and back to N. During this time the transmitter will still be sending the preamble. It is believed that this time period will guarantee that any receiver in any scan state will always be able to detect and synchronize to a transmitting node during the long SYNC_FLD 762 preamble 740 of a burst 700. If the channel N is being interfered with so that any receiver can't recover the B_PDU, the same receive and transmit scenario exists when the transmitting node beings sending the preamble 740 on channel N+1 and N+2.

RF Hopping Protocol RECEIVE State 420

Figure 13:
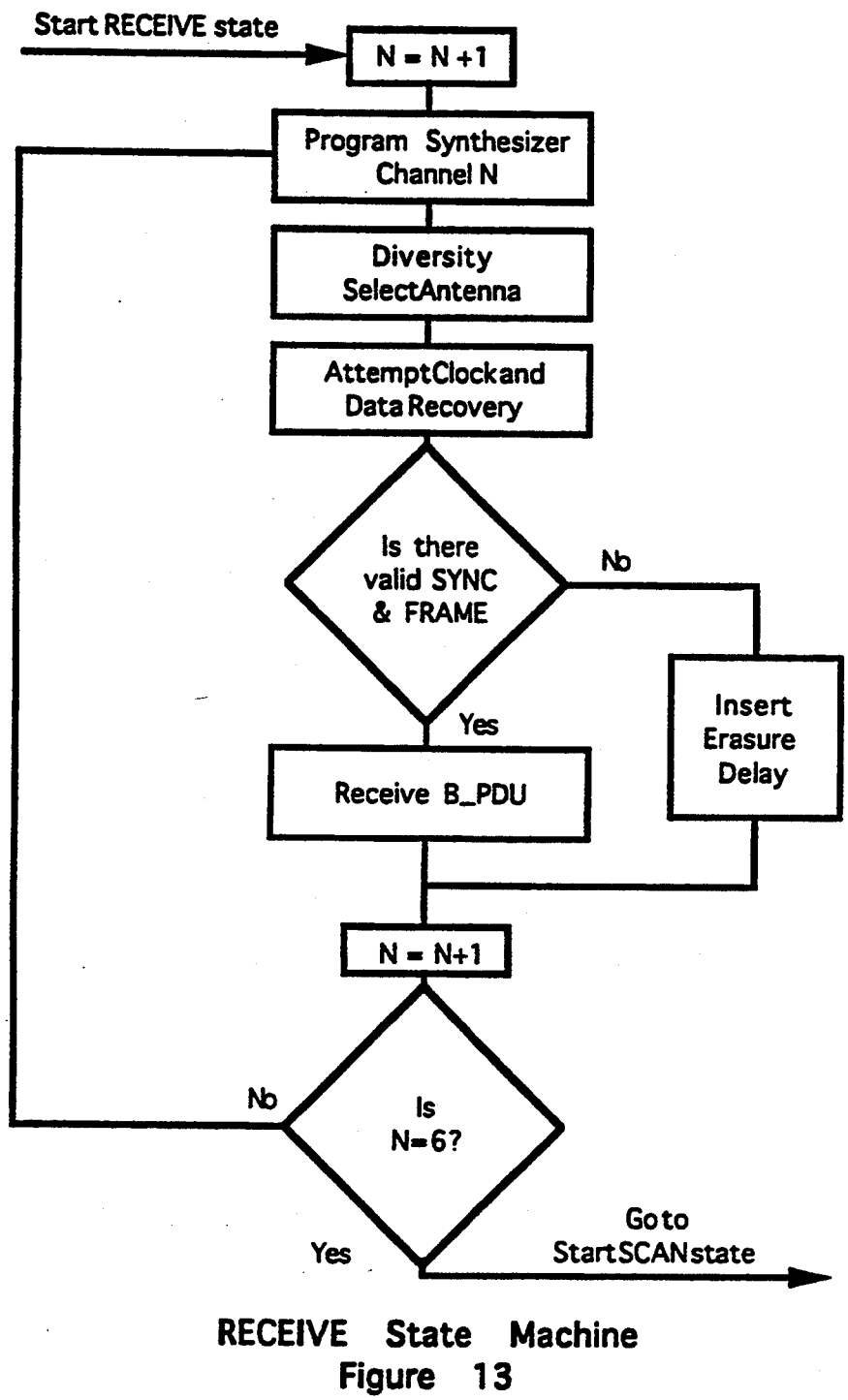
FIG. 13 is a flow chart of the RECEIVE state.

Reference is now made to FIG. 13. The RECEIVE state 420 operates similarly with the SCAN state 410 with a few exceptions. The requirement for entering the RECEIVE state 420 is the reception of a valid B_PDU_HDR 712. Since all B_PDU_HDRs 712 are identical for the B_PDUs 710 of the same MAC_PDU 500, the RECEIVE state 420 does not have to search for any more valid B_PDU_HDRs 712. The length field 722 found in the first valid B_PDU_HDR 712 will be used by the RECEIVE state 420 to capture the remaining B_PDUs 710 or to insert ERASURE DELAYs.

Figure 14:
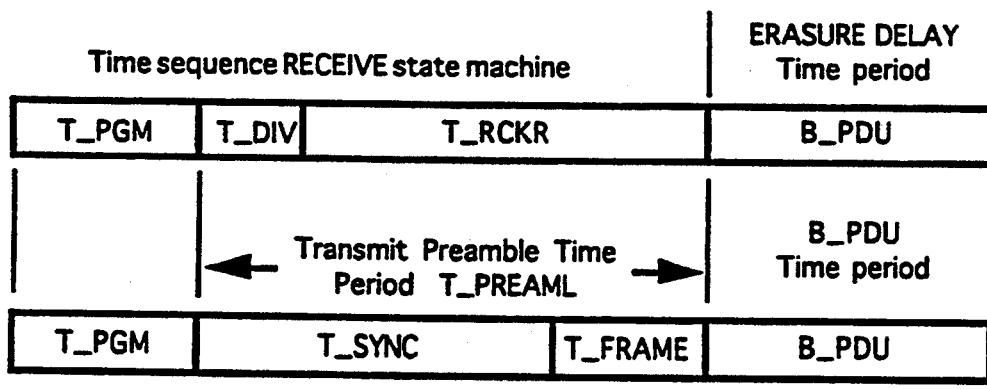
FIG. 14 is an illustration of the timing relationship between the TRANSMIT and RECEIVE states for a long preamble.
Figure 15:
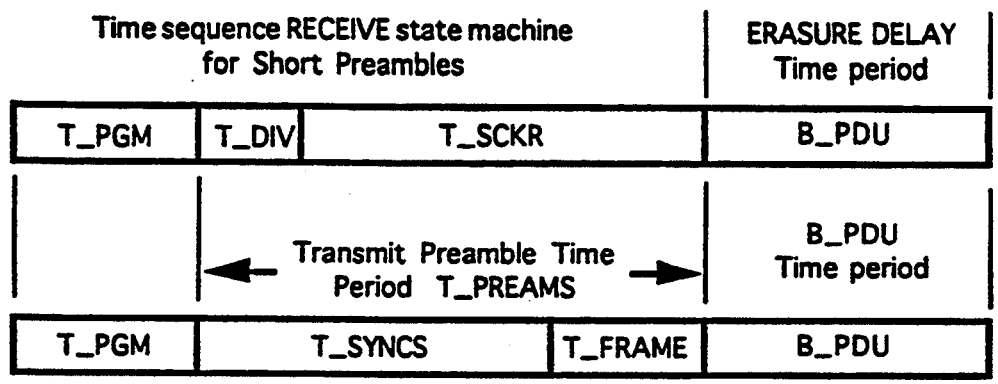
FIG. 15 is an illustration of the timing relationship between the TRANSMIT and RECEIVE states for a short preamble.

The RECEIVE state 420 starts out as shown in FIG. 13 out by incrementing the channel number and programming the synthesizer for the next channel. This requires a time period of T_PGM as in the SCAN state 410. The diversity operation is next and its time period is again T_DIV. Since there is no longer a requirement to quickly scan because the receiver is now synchronized with a transmitting node, the RECEIVE state 420 can take a time period of T_RCKR to attempt to recover clock and data, detect the SYNC_FLD and then see the FRM_FLD as shown in FIG. 14 for the first three bursts. This time period reverts back to T_SCKR for the final two burst as shown in FIG. 15. The fourth burst 700d and the fifth burst 700e are transmitted with shorter preambles 740 (i.e., shorter SYNC_FLDs 764) because any receiver which is attempting to acquire the packet 500 must have received at least one of the first three bursts 700a–c and be in sync in order to have a need to receive the last two bursts 700d–e.

After the T_SCKR or T_RCKR period, the receiver must find a FRAME symbol in the FRM_FLD 756. If frame is found, the receiver accepts the incoming B_PDU 710. If a FRAME symbol isn't found, the receiver inserts an ERASURE DELAY. This delay simulates the time the receiver would have taken to receive a good B_PDU 710 so that it remains in sync with the transmitting node. After the completion of the either of these two functions, the receiver increments the channel number and continues in sync with the transmitter until all five channels have been programmed. When the RECEIVE state 420 is completed, the protocol returns to the SCAN state 410.

RF Hopping Protocol CARRIER SENSE State 430

Figure 16:
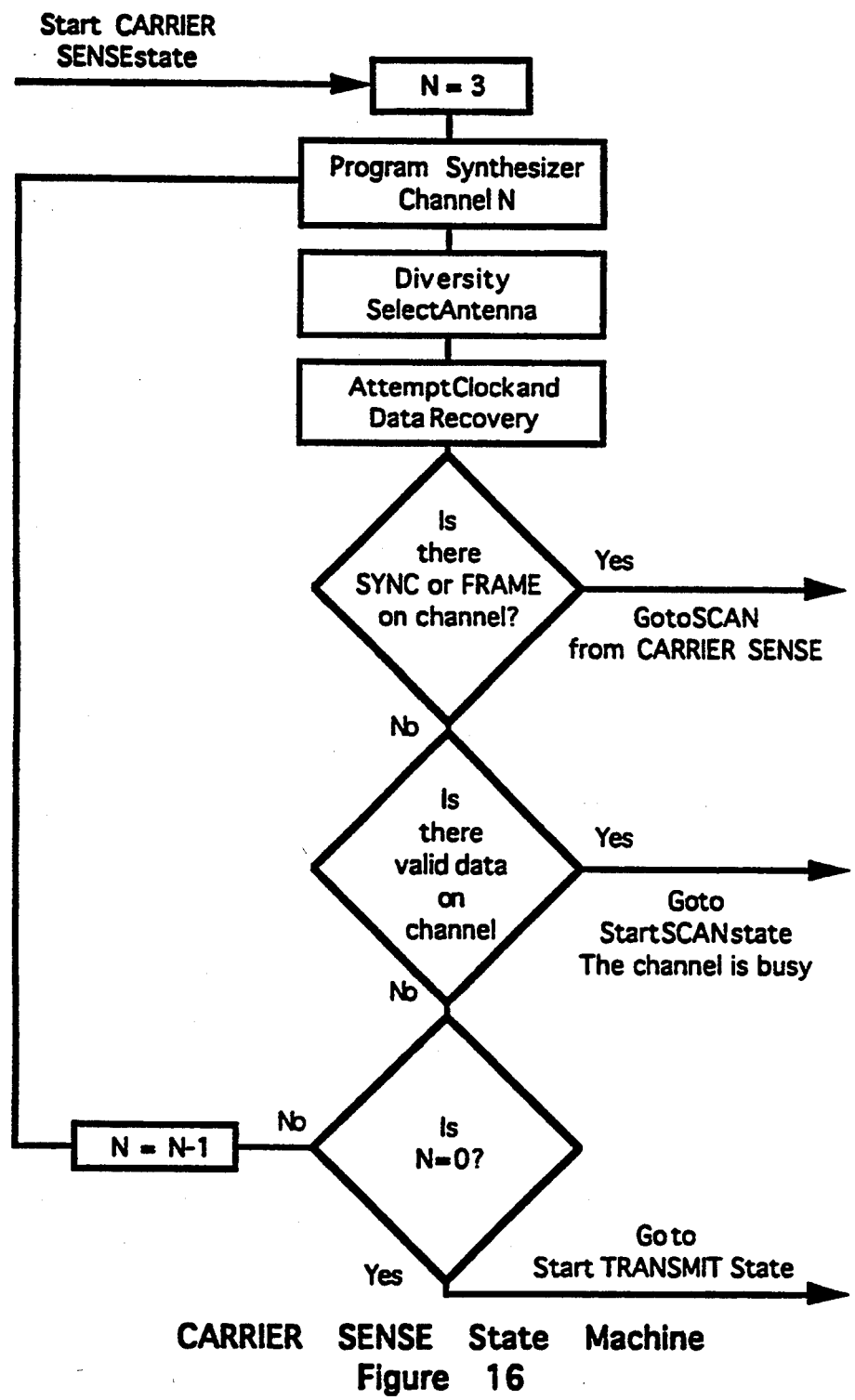
FIG. 16 is a flow chart of the CARRIER SENSE state.

Reference is now made to FIG. 16. As stated before, the CARRIER SENSE state 16 is entered into from the SCAN state 410 when a request to transmit data is pending. Thus, the CARRIER SENSE state 430 is entered into before transmitting data. The procedure followed in the CARRIER SENSE state 430 is useful to determine if the media is busy prior to the start of TRANSMIT state 440. The CARRIER SENSE state 430 is very close in function to the SCAN state 410 except that the first three channels are scanned in reverse order. As shown in FIG. 16, the CARRIER SENSE state 430 uses the same time period for programming the synthesizer, T_PGM, diversity, T_DIV, and clock and data recovery, T_SCKR. If it detects the SYNC_FLD 762 or FRM_FLD 756 during T_SCKR, it will abandon the CARRIER SENSE state 430 and move back into the SCAN state 410 to attempt to recover the burst 700. If the clock and date recovery circuit recover clock and data but not a SYNC or FRAME symbol, the function will return a channel busy flag, which indicates to the protocol engine 44 that the channel contained the middle of a B_PDU 710 and that the protocol state machine should return to the SCAN state 410 to attempt to synchronize on the next burst 700. If the CARRIER SENSE state 430 doesn't find any channels busy, the protocol engine 44 advances to the TRANSMIT state 440.

RF Hopping Protocol TRANSMIT State 440

Figure 17:
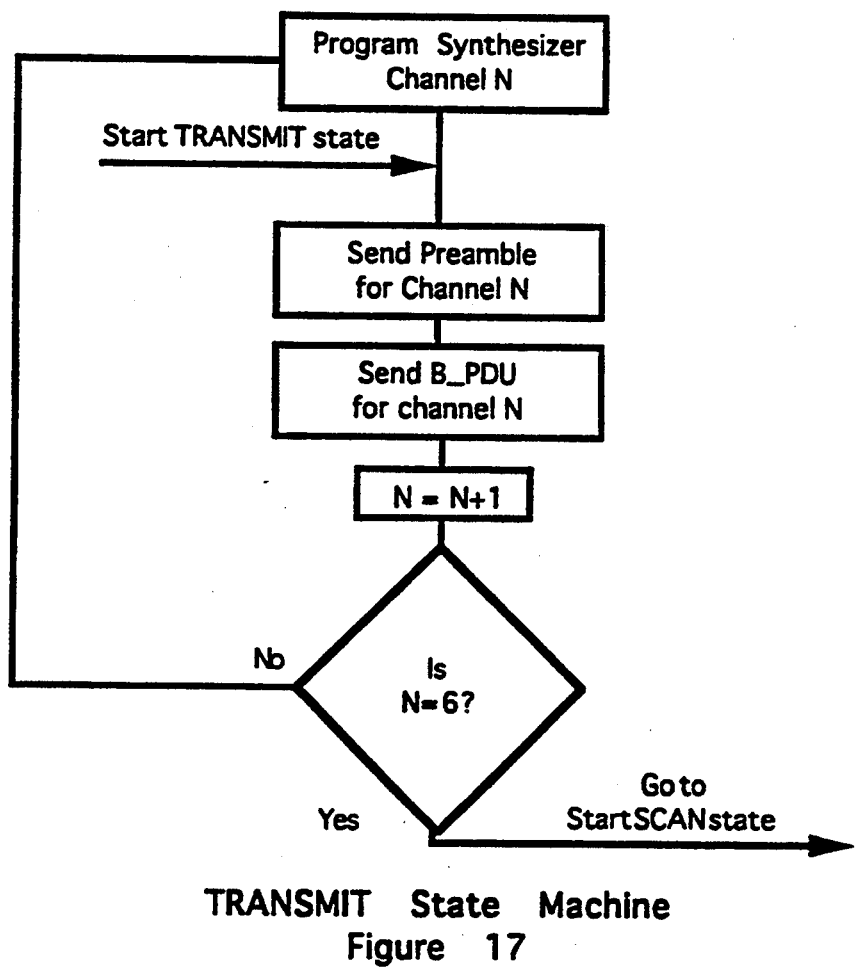
FIG. 17 is a flow chart of the TRANSMIT state.

Reference is now made to FIG. 17 which shows a flow chart of the TRANSMIT state 440. The TRANSMIT state 440 is entered from the CARRIER SENSE state 430 after the first channel has been scanned. Since the first channel is also the first channel the TRANSMIT state 440 will send data out on, there is no need for the RF control unit 26 (FIG. 1) transmitter to reprogram the synthesizer 28, so it immediately begins to send the long SYNC_FLD 762 for the preamble for the first burst 700. After sending the preamble 740 and B_PDU 710 for the first burst 700, the TRANSMIT state 440 increments the channel count, programs the synthesizer 28 and sends the next preamble 740 and B_PDU 710.

SUMMARY

Reference is now made to FIGS. 18A and 18B which are flow charts of steps of the described method of segmenting the packet, encoding the segments, transmitting bursts, receiving at least some of the bursts, decoding the received bursts, and, if possible, reconstructing the packet. The operations to perform the steps illustrated in FIGS. 18A and 18B have been described elsewhere in this document.

From the above description, it will be apparent that the invention disclosed herein provides a novel and advantageous decentralized communication system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

APPENDIX A
TABLE OF ACRONYMS

| Acronym | No. | Definition |
|---|---|---|
| MAC_PDU | 500 | Medium Access Control Protocol Data Unit |
| MAC | | Medium Access Control Layer |
| RF_AL | | RF Adoption Layer |
| RFAL_DU | 530 | RF Adoption Layer Data Unit |
| RFAL_PDU | 532 | RF Adoption Layer Protocol Data Units |
| RF_AL ECDU | 534 | RF Adoption Layer Error Correction Data Units |
| RFAL_HDR | 530 | RF Adoption Layer Header |
| DEC Field | 610 | Data Error Control Field |
| FRM_FLD | 756 | Framing Field |
| SYNC_FLD | 750 | Synchronization Field |
| B_PDU HDR | 712 | Burst Protocol Data Unit Header |
| B_PDU | 710 | Burst Protocol Data Unit |
| RF_TC | | RF Transmission Convergence Layer |
| RF_PHY | | RF Physical Layer |
| HEC Field | 724 | Header Error Control Field |
| RF_TC ID Field | 910 | Channel ID Field |
| RF_TC B_PDU | 900 | Burst Protocol Data Unit |
| L Field | 722 | Length Field |
| T_PRGM | | Time Period for Radio to Settle on a Channel |
| T_DIV | | Time Period for Antenna Diversity Operation |
| T_SCKR | | Time Period of Scan Clock Recovery Time; attempt to detect SHORT SYNC_FLD and FRM_FLD |
| T_SCAN | | Time period for Scanning One Channel |
| T_PREAML | | Time Period of Preamble Transmission |
| T_SYNC | | Time Period of SYNC_FLD |
| T_FRAME | | Time Period of FRM_FLD |
| T_RCKR | | Time Period to attempt to detect LONG SYNC_FLD and FRM_FLD |

What is claimed is:

1. In a communication system for networking a plurality of stations, each of which includes a transmitter and a receiver, a method for encoding a packet of data supplied by a Medium Access Control ("MAC") layer in a transmitting station that transmits said data in a series of N bursts and decoding received data units in a receiving station that receives at least one of said bursts, said method comprising the steps of:

(a) in said transmitting station, forming said packet into at least one data segment having a first data byte unit and a second data byte unit;

(b) forming an error correction (EC) segment from said data segment, said EC segment having a first EC byte unit that corrects errors in said first data byte unit and a second EC byte unit that corrects errors in the second data byte unit;

(c) fragmenting each of said data segment and EC segment into a plurality of fragments;

(d) for each fragment, calculating a data error control (DEC) field and including said DEC field in the segment associated with said fragment so that each segment together with its associated DEC fields defines a data unit ("DU");

(e) transmitting said DUs in a series of N bursts;

(f) receiving at least one of said bursts in a receiving station;

(g) utilizing the DEC field to mark each fragment in said received bursts as one of good and bad; and (h) defining a plurality of fragment columns, each fragment column defined to include a fragment from each of said N bursts, and, for each of said fragment columns, totaling a number of good fragments, and if said number of good fragments is greater than a number (N-e) that is the minimum number of fragments necessary to reconstruct the data in the fragments of each column, then reconstructing the packet.

2. The method of claim 1, wherein said step (d), calculating a DEC field, includes calculating a random error correction field, and wherein said step (g) includes calculating the random error correction field for each received fragment, and comparing it with the received random error correction field in the DEC field associated with that fragment.

3. The method of claim 1, wherein said step (b) includes utilizing a Reed-Solomon error correction code to form said EC segment, and wherein said step (h), reconstructing the packet includes utilizing said Reed-Solomon code to correct errors in the data segment.

4. The method of claim 1, wherein said steps (e) and (f) include utilizing a slow frequency hopping system to transmit said series of bursts and to receive at least one of said bursts.

5. The method of claim 4 wherein said steps (a)-(h) are performed in said plurality of stations in the network, including performing said steps (a)-(e) in the transmitting station and performing said steps (f)–(h) in a plurality of receiving stations.

6. In a communication system for networking a plurality of stations, each of which includes a transmitter and a receiver, a method for encoding a packet of data supplied by a Medium Access Control ("MAC") layer in a transmitting station that transmits said data in a series of N bursts and decoding received data units in a receiving station that receives at least one of said bursts, said method comprising the steps of:
  (a) in said transmitting station, dividing said packet into a plurality of data segments having an equal length, each having a first data byte unit and a second data byte unit;
  (b) forming at least one error correction (EC) segment from said plurality of data segments, said EC segment having an equal length with said data segments, said EC segment having a first EC byte unit that corrects errors in said first data byte units and a second EC byte unit that corrects errors in the second data byte units;
  (c) fragmenting each of said data segments and EC segments into a plurality of fragments;
  (d) for each fragment, calculating a data error control (DEC) field and including said DEC field in the segment associated with said fragment so that each segment together with its associated DEC fields defines a data unit ("DU");
  (e) transmitting said DUs in a series of N___bursts; (f) receiving at least one of said bursts in a receiving station; (g) utilizing the DEC field to mark each fragment in said received bursts as one of good and bad; and
  (h) defining a plurality of fragment columns, each fragment column defined by like-numbered data byte units and EC byte units from said N bursts, and, for each of said fragment columns, totaling a number of good fragments, and if said number of good fragments is greater than a number (N-e) that is the minimum number of fragments necessary to reconstruct the data in the fragments of each column, then reconstructing the packet.

7. The method of claim 6, wherein said step (d), calculating a DEC field, includes calculating a random error correction field, and wherein said step (g) includes calculating the random error correction field for each received fragment, and comparing it with the received random error correction field in the DEC field associated with that fragment.

8. The method of claim 6, wherein said step (b) includes utilizing a Reed-Solomon error correction code to form said EC segment, and wherein said step (h), reconstructing the packet includes utilizing said Reed-Solomon code to correct errors in the data segments.

9. The method of claim 6, wherein said steps (e) and (0 include utilizing a slow frequency hopping system to transmit said series of bursts and to receive at least one of said bursts.

10. The method of claim 9 wherein said steps (a)–(h) are performed in said plurality of stations in the network, including performing said steps (a)–(e) in said transmitting station and performing said steps (f)–(h) in a plurality of receiving stations.

11. A communications system for a station in a network including a plurality of stations, said communications system coupled to a computer processing unit ("CPU") in the station that provides a packet of data for transmission and receives a received packet of data, said station communicating with other stations in the network utilizing a slow frequency hopping system that transmits a series of N bursts using a plurality of N frequencies and a predetermined channel sequence, said communications system comprising:
  a LAN controller including a protocol engine coupled to the CPU, said protocol engine including
    (a) segmentation means for forming said packet into at least one data segment having a first data byte unit and a second data byte unit,
    (b) segment error correction means for forming an error correction (EC) segment from said data segment, said EC segment having a first EC byte unit that corrects errors in said first data byte unit and a second EC byte unit that corrects errors in the second data byte unit;
    (c) fragmentation means for fragmenting each of said data segment and EC segment into a plurality of fragments,
    (d) DEC means for calculating a data error control (DEC) field for each fragment, and for including said DEC field in the segment associated with said fragment so that each segment together with its associated DEC fields defines a data unit ("DU"),
    (e) transmitting control means for transmitting said DUs in a series of N bursts,
    (f) receiving control means for receiving at least one of said bursts in a receiving station,
    (g) marking means utilizing the DEC field to mark each fragment in said received bursts as one of good and bad, and
    (h) reconstruction mapping means including, for each of a plurality of fragment columns defined to include a fragment from each of said N bursts, means for totaling a number of good fragments for each of said fragment columns, and if said good number is greater than a number (N-e) that is the minimum number of fragments necessary to reconstruct the data in the fragments of each column, then reconstructing the packet;
  a radio frequency (RF) modem coupled to the LAN controller, including
    a frequency synthesizer for producing a plurality of RF frequencies,
    a RF control unit coupled to the frequency synthesizer for selecting a radio frequency,
    a RF receiver,
    a RF transmitter; and
  an antenna coupled to said RF modem for receiving said plurality of frequencies.

12. A communications system for a station in a network including a plurality of stations, said communications system coupled to a computer processing unit ("CPU") in the station that provides a packet of data for transmission and receives a received packet of data, said station communicating with other stations in the network utilizing a slow frequency hopping system that transmits a series of N bursts using a plurality of N frequencies and a predetermined channel sequence, said communications system comprising:
  a LAN controller including a protocol engine coupled to the CPU, said protocol engine including
    (a) segmentation means for dividing said packet into a plurality of data segments having an equal length, each having a first data byte unit and a second data byte unit, (b) segment error correction means for forming at least one error correction (EC) segment from said plurality of data segments, said EC segment having an equal length with said data segments, said EC segment having a first EC byte unit that corrects errors in said first data byte units and a second EC byte unit that corrects errors in the second data byte units, (c) fragmentation means for fragmenting each of said data segments and EC segments into a plurality of fragments, (d) DEC means for calculating a data error control (DEC) field for each fragment, and for including said DEC field in the segment associated with said fragment so that each segment together with its associated DEC fields defines a data unit ("DU"), (e) transmission control means for transmitting said DUs in a series of N bursts, (f) reception control means for receiving at least one of said bursts in a receiving station, (g) marking means utilizing the DEC field to mark each fragment in said received bursts as one of good and bad, and (h) reconstruction mapping means including, for each of a plurality of fragment columns defined by like-numbered data byte units and EC byte units from each of said N bursts, means for totaling a number of good fragments for each of said fragment columns, and if said good number is greater than a number (N-e) that is the minimum number of fragments necessary to reconstruct the data in the fragments of each column, then reconstructing the packet;

a radio frequency (RF) modem coupled to the LAN controller, including a frequency synthesizer for producing a plurality of RF frequencies, a RF control unit coupled to the frequency synthesizer for selecting a radio frequency, a RF receiver, a RF transmitter; and an antenna coupled to said RF modem for receiving said plurality of frequencies.

* * * * *